US006842429B1

(12) United States Patent
Shridhar et al.

(10) Patent No.: US 6,842,429 B1
(45) Date of Patent: Jan. 11, 2005

(54) METHOD AND APPARATUS FOR SYNCHRONIZING A PACKET BASED MODEM SUPPORTING MULTIPLE X-DSL PROTOCOLS

(75) Inventors: Avadhani Shridhar, Santa Clara, CA (US); T. R. Ramesh, Union City, CA (US); Raminder S. Bajwa, Palo Alto, CA (US); Masoud Eskandari, San Jose, CA (US); Firooz Massoudi, Santa Clara, CA (US); Omprakash S. Sarmaru, Fremont, CA (US); Behrooz Rezvani, Pleasanton, CA (US)

(73) Assignee: Ikanos Communications, Inc, Fremont, CA (US)

( * ) Notice: Subject to any disclaimer, the term of this patent is extended or adjusted under 35 U.S.C. 154(b) by 825 days.

(21) Appl. No.: 09/776,066

(22) Filed: Feb. 2, 2001

Related U.S. Application Data

(60) Provisional application No. 60/179,862, filed on Feb. 22, 2000.

(51) Int. Cl.$^7$ .............................................. H04L 12/26
(52) U.S. Cl. ..................................... 370/252; 375/222
(58) Field of Search .............................. 370/252, 282, 370/389, 431, 419, 480, 463, 535; 375/222

(56) References Cited

U.S. PATENT DOCUMENTS

| 6,320,867 | B1 | * | 11/2001 | Bellenger et al. | ........... 370/420 |
| 6,519,456 | B2 | * | 2/2003 | Antonio et al. | ............ 455/442 |
| 2002/0064142 | A1 | * | 5/2002 | Antonio et al. | ............ 370/335 |
| 2002/0098842 | A1 | * | 7/2002 | Antonio et al. | ............ 455/442 |

* cited by examiner

*Primary Examiner*—David Vincent
(74) *Attorney, Agent, or Firm*—IP Creators; Charles C. Cary

(57) ABSTRACT

The current invention provides a digital signal processor which supports multiple X-DSL protocols and a multiplicity of channels on a single chip. Each channel is packetized and each packet includes control information for controlling the performance of the components/modules on the transmit and receive path. Further flexibility is derived from an architecture which incorporates discrete and shared modules on the transmit path and the receive path. The transmit path and receive path modules are collectively controlled by control information in selected ones of the packets and operate on each channel's packets at an appropriate rate, and protocol for the channel. A digital signal processor (DSP) is disclosed which incorporates these features. The DSP exhibits a favorable form factor, and flexibility as to protocols and line codes, and numbers of channels supported.

20 Claims, 10 Drawing Sheets

DSP PACKETS

METHOD AND APPARATUS FOR SYNCHRONIZING A PACKET BASED MODEM SUPPORTING MULTIPLE X-DSL PROTOCOLS

CROSS REFERENCE TO RELATED APPLICATION

This application claims the benefit of prior filed co-pending Provisional Application No. 60/179,862 entitled "DMT ENGINE" filed on Feb. 2, 2000 which is incorporated herein by reference in its entirety.

BACKGROUND OF THE INVENTION

1. Field of Invention

This invention relates generally to communications, and more particularly, digital signal processors which provide support for both the discrete Fourier transform (DFT) and the inverse discrete Fourier transform (IDFT).

2. Description of the Related Art

North American Integrated Service Digital Network (ISDN) Standard, defined by the American National Standard Institute (ANSI), regulates the protocol of information transmissions over telephone lines. In particular, the ISDN standard regulates the rate at which information can be transmitted and in what format. ISDN allows full duplex digital transmission of two 64 kilo bit per second data channels. These data rates may easily be achieved over the trunk lines, which connect the telephone companies' central offices. The problem lies in passing these signals across the subscriber line between the central office and the business or residential user. These lines were originally constructed to handle voice traffic in the narrow band between 300 Hz to 3000 Hz at bandwidths equivalent to several kilo baud.

Digital Subscriber Lines (DSL) technology and improvements thereon including: G.Lite, ADSL, VDSL, SDSL, MDSL, RADSL, HDSL, etc. all of which are broadly identified as X-DSL have been developed to increase the effective bandwidth of existing subscriber line connections, without requiring the installation of new fiber optic cable. An X-DSL modem operates at frequencies higher than the voice band frequencies, thus an X-DSL modem may operate simultaneously with a voice band modem or a telephone conversation.

X-DSL modems are typically installed in pairs, with one of the modems installed in a home and the other in the telephone companies central office (CO) switching office servicing that home. This provides a direct dedicated connection to the home from a line card at the central office on which the modem is implemented through the subscriber line or local loop. Modems essentially have three hardware sections: (a) an analog front end (AFE) to convert the analog signals on the subscriber line into digital signals and convert digital signals for transmission on the subscriber line into analog signals, (b) digital signal processing (DSP) circuitry to convert the digital signals into an information bit stream and optionally provide error correction, echo cancellation, and line equalization, and (c) a host interface between the information bit stream and its source/destination. Typically all of these components are located on a highly integrated single line card with a dedicated connection between one or more AFE's and a DSP.

Within each X-DSL protocol there are at least two possible line codes, or modulation protocols; i.e. discrete multitone (DMT) and carrierless AM/PM (CAP). The first of these line codes, i.e. DMT, requires the DSP to implement both an inverse fast Fourier transform (IFFT) on upstream data received from the subscriber and a fast Fourier transform (FFT) on the downstream data transmitted to the subscriber. Typically the DSP is available as a discrete semiconductor chip which implements the transforms for a dedicated one of the X-DSL standards using software routines running on an internal processor.

Each X-DSL installation represents a sizeable expense in hardware and service labor to provision the central office. The expense may not always be amortized over a sufficient period of time due the relentless introduction of new and faster X-DSL standards each of which pushes the performance boundaries of the subscriber line in the direction of increasing bandwidth and signal integrity. As each new standard involves, line cards must typically be replaced to upgrade the service.

What is needed is a less rigid signal DSP processing architecture that allows a more flexible hardware response to the evolving X-DSL standards and the problems associated with providing hardware to handle each new standard.

SUMMARY OF THE INVENTION

A method and apparatus for digital signal processing of X-DSL protocols is disclosed. A digital signal processor (DSP) which supports multiple X-DSL protocols and a multiplicity of channels on a single chip is disclosed. Each channel is packetized and each packet includes control information for controlling the performance of the components/modules on the transmit and receive path. Further flexibility is derived from an architecture which incorporates discrete and shared modules on the transmit path and the receive path. The transmit path and receive path modules are collectively controlled by control information in selected ones of the packets. This control information is used by selected ones of the modules to appropriately process each channel in conformance with the corresponding X-DSL protocol, operating on each channel's packets at an appropriate rate, and protocol for the channel. The DSP exhibits a favorable form factor, and flexibility as to protocols and line codes, and numbers of channels supported.

In an embodiment of the invention an X-DSL signal processor is disclosed which supports a plurality of channels in one or more X-DSL protocols. The signal processor includes transmit and receive path packet assemblers and a plurality of modulation and demodulation modules. The transmit path packet assembler packetizes digitized data from a plurality of communication channels into corresponding transmit packets. The transmit path packet assembler injects transmit control parameters into selected ones of the packets to control the modulation thereof in accordance with at least one of a plurality of X-DSL protocols. The receive path packet assembler packetizes digitized symbols from the plurality of communication channels into corresponding receive packets. The receive path packet assembler injects receive control parameters into selected ones of said packets to control the demodulation thereof. The plurality of modulation and demodulation modules are configured to form a transmit path and a receive path for the modulation and demodulation of the transmit and receive packets respectively. Selected ones of the modules are responsive to the control parameters injected by at least one of the transmit path packet assembler and the receive path packet assembler to vary a processing of the corresponding packet. A corresponding method is disclosed.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF THE EMBODIMENTS

A method and apparatus for digital signal processing of X-DSL protocols is disclosed. A digital signal processor (DSP) which supports multiple X-DSL protocols and a multiplicity of channels on a single chip is disclosed. Each channel is packetized and each packet includes control information for controlling the performance of the components/modules on the transmit and receive path. Further flexibility is derived from an architecture which incorporates discrete and shared modules on the transmit path and the receive path. The transmit path and receive path modules are collectively controlled by control information in selected ones of the packets. This control information is used by selected ones of the modules to appropriately process each channel in conformance with the corresponding X-DSL protocol, operating on each channel's packets at an appropriate rate, and protocol for the channel. The DSP exhibits a favorable form factor, and flexibility as to protocols and line codes, and numbers of channels supported.

Figure 1:
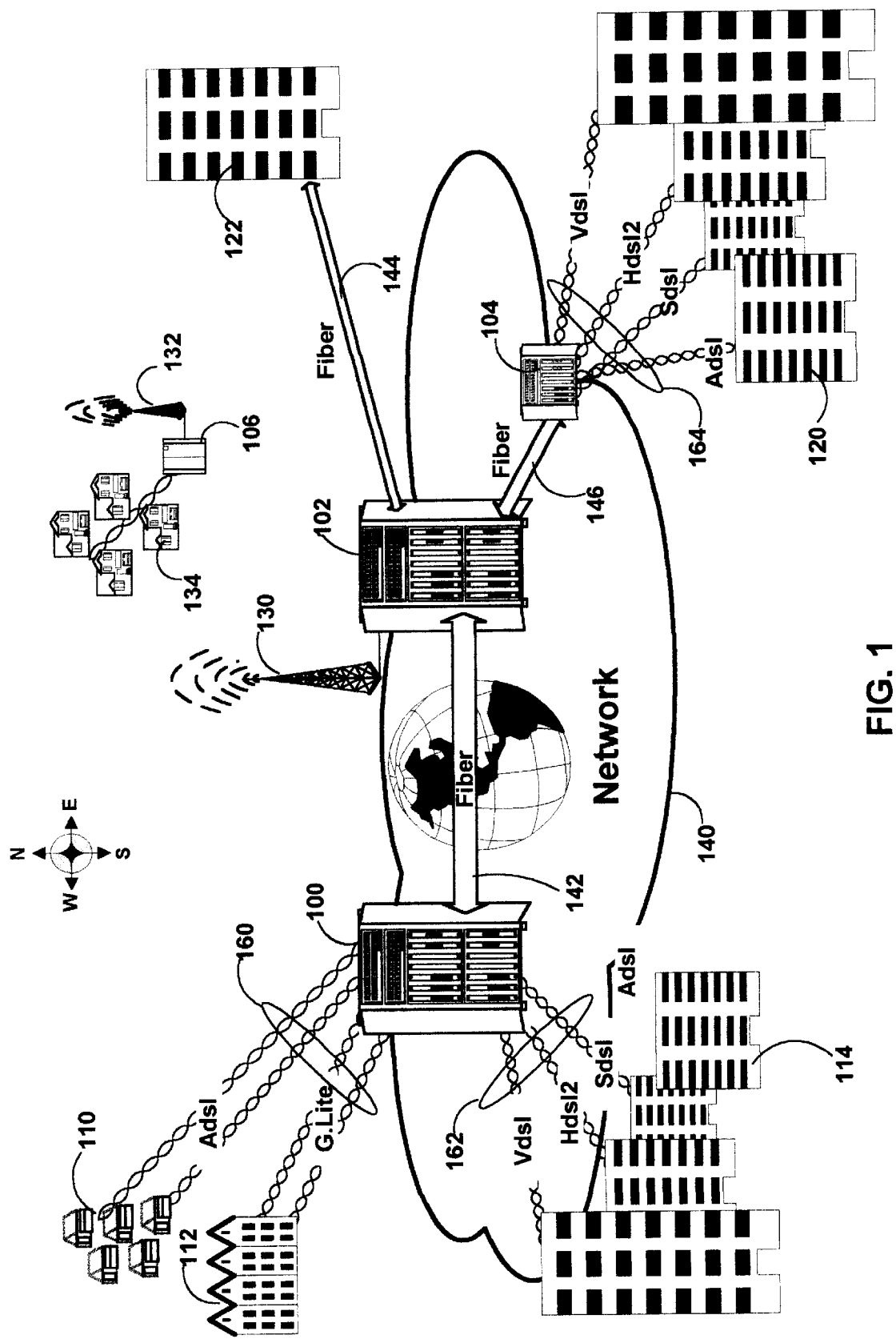
FIG. 1 depicts an overall system environment in which individual subscribers are coupled across public service telephone network (PSTN) subscriber lines with one or more high speed networks.

FIG. 1 depicts an overall system environment in which individual subscribers are coupled across public service telephone network (PSTN) subscriber lines with one or more high speed networks. Telco COs 100, 102, 106 and remote access terminal 104 are shown coupling various subscribers to one another and to a high speed network 140. The high speed network 140 provides fiber optic links between the central office and remote access terminal. CO's 100–102 are coupled to one another via fiber optic link 142. CO 102 couples to remote access terminal 104 via fiber optic link 146. CO also couples to subscriber site 122 via fiber optic link 144. CO 102 and CO 106 couple to one another via a wireless link provided by corresponding wireless transceivers 130 and 132 respectively. The "last mile" connecting each subscriber, (except subscriber 122) is provided by twisted copper PSTN telephone lines. On these subscriber lines voice band and data communication are provided. The data communication is shown as various X-DSL protocols including G.Lite, ADSL VDSL, and HDSL2. CO 100 is coupled via G.Lite and ADSL modulated subscriber line connections 160 with subscribers 110 and 112. CO 100 is also coupled via G.Lite and ADSL modulated subscriber line connections 162 with subscriber 114. CO 106 is also coupled via a subscriber line to subscriber 134. Remote access terminal is coupled via subscriber line connections 164 with subscribers 120. In each case the corresponding CO may advantageously be provided with distributed AFE and DSP resources for handling multiple protocols from multiple locations with the added benefit of load balancing, and statistical multiplexing. The apparatus and method of the current invention is suitable for handling communications on any of these subscriber lines.

In an alternate embodiment of the invention communications are also provided between DSP resources at one site, e.g. CO 100 and AFE resources at a separate site, e.g. CO 102. This later capability allows distributed processing whereby all DSP resources can be placed in a logical server environment hence supporting a client server architecture.

Figure 2:
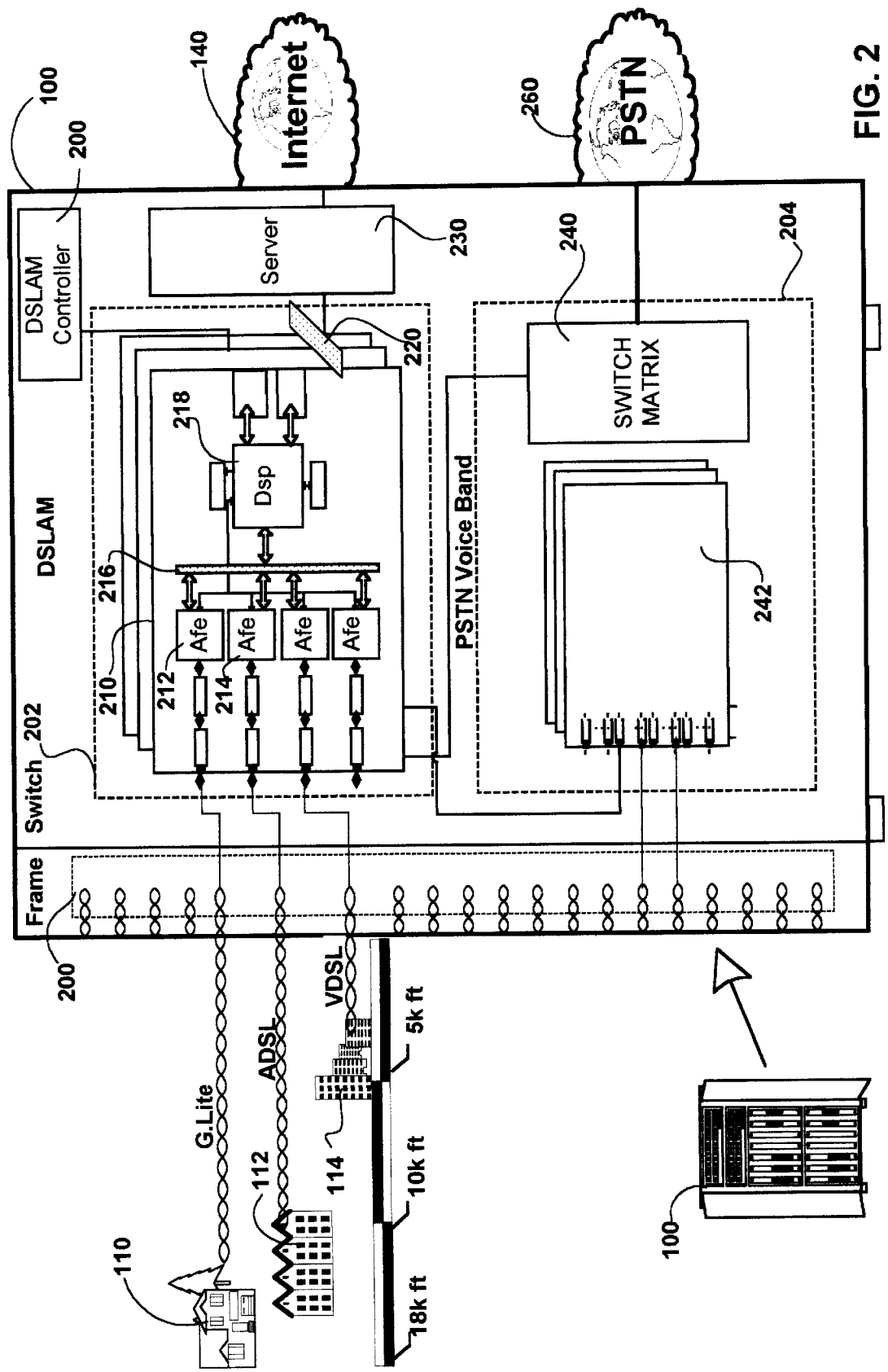
FIG. 2 depicts a more detailed view of a representative one of the central offices shown in FIG. 1 including both digital subscriber line access modules (DSLAMs) and PSTN voice band modules.

FIG. 2 depicts a more detailed view of a representative one of the central offices shown in FIG. 1 including both digital subscriber line access modules (DSLAMs) and PSTN voice band modules. The CO 100 includes subscriber line connections to subscribers 110–114. Each of these connections terminates in the frame room 200 of the CO. From this room connections are made for each subscriber line via splitters and hybrids to both a DSLAM 202 and to the voice band racks 204. The splitter shunts voice band communications to dedicated line cards, e.g. line card 242 or to a voice band modem pool (not shown). The splitter shunts higher frequency X-DSL communications on the subscriber line to a selected line card 210 within DSLAM 202. The line cards of the current invention are universal, meaning they can handle any current or evolving standard of X-DSL and may be upgraded on the fly to handle new standards.

Voice band call set up is controlled by a Telco switch matrix 240 such as SS. This makes point-to-point connections to other subscribers for voice band communications. The X-DSL communications may be processed by a universal line card such as line card 212. That line card includes a plurality of AFE's e.g. 212–214 each capable of supporting a plurality of subscriber lines. The AFEs are coupled via a proprietary packet based bus 216 to a DSP 218 which is also capable of multi-protocol support for all subscriber lines to which the AFE's are coupled. The line card itself is coupled to a back-plane bus 220 which may in an embodiment of the invention be capable of offloading and transporting low latency X-DSL traffic between other DSPs for load balancing. Communications between AFE's and DSP(s) are packet based which allows a distributed architecture such as will be set forth in the following FIG. 3 to be implemented. Each of the DSLAM line cards operates under the control of a DSLAM controller 200 which handles global provisioning, e.g. allocation of subscriber lines to AFE and DSP resources. Once an X-DSL connection is established between the subscriber and a selected one of the DSLAM submodules, e.g. AFE and DSP the subscriber will be able to access any network to which the DSLAM is connected. In the example shown the DSLAM couples via server 230 with Internet 140.

Figure 3:
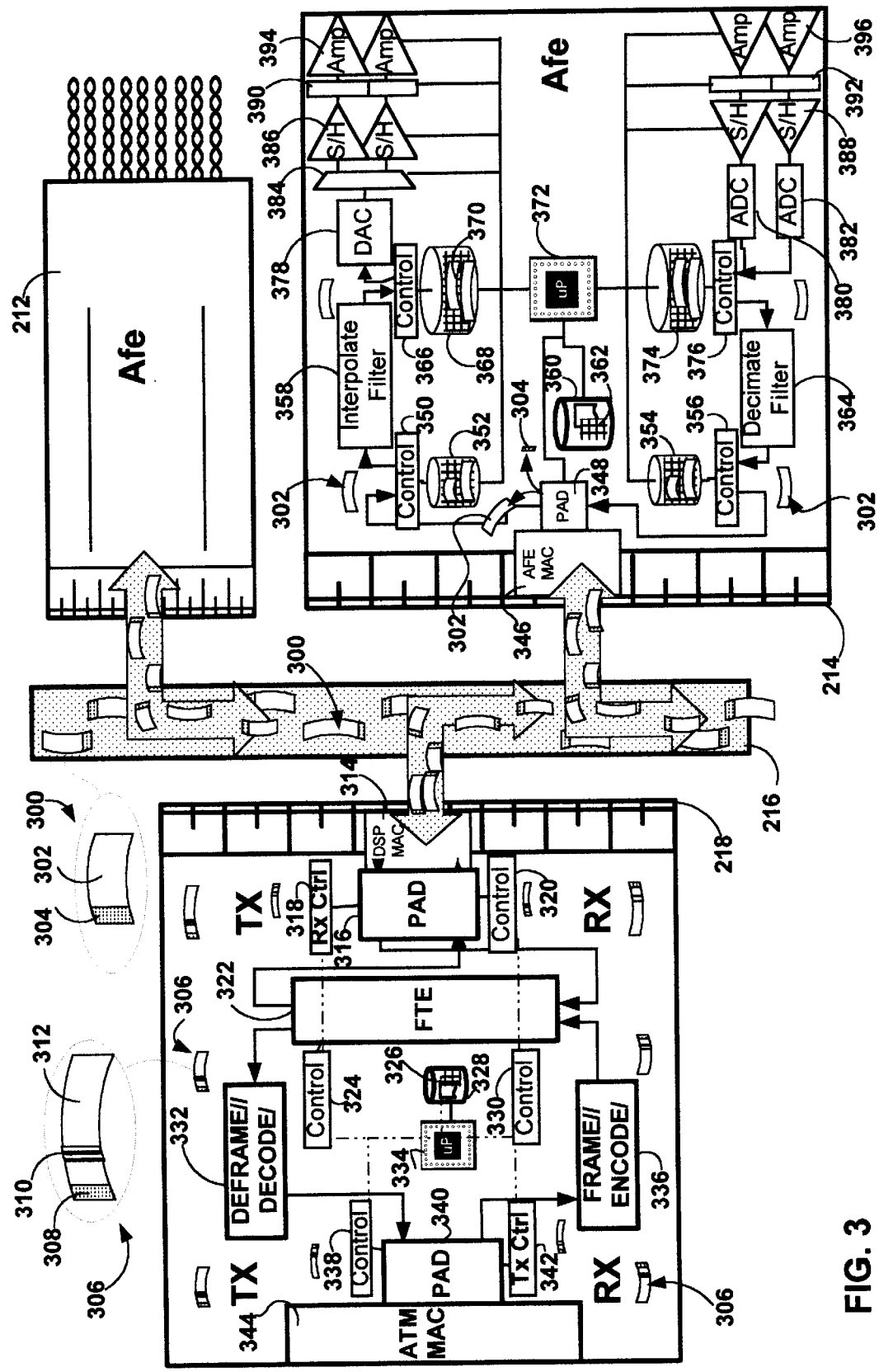
FIG. 3 is an expanded hardware view of one of the line cards in the central office shown in FIG. 2.

FIG. 3 is a chip level view of an embodiment of the invention in which multiple AFE's chips 212–214 connect with a DSP chip 218 across bus 216. They all may be mounted on the line card 210 shown in FIG. 2. Packets of raw data are shown being transported between the DSP and AFEs as well as within each DSP and AFE. Packet processing between the DSP and AFE chips involves transfer of bus packets 300. Packet processing within a DSP may involve device packets 306 (See FIG. 5). Packet processing within an AFE may involve raw data packets 302. These will be discussed in the following text.

These modules, AFE and DSP, may be found on a single universal line card, such as line card 210 in FIG. 2. They may alternately be displaced from one another on separate line cards linked by a DSP bus. In still another embodiment they may be found displaced from one another across an ATM network. There may be multiple DSP chipsets on a line card. In an embodiment of the invention the DSP and AFE chipsets may include structures set forth in the figure for handling of multiple line codes and multiple channels.

The DSP chip 218 includes an upstream (receive) and a downstream (transmit) processing path with both discrete and shared modulation and demodulation modules. Selected ones of the modules are responsive to packet header information and/or control information to vary their processing of each packet to correspond with the X-DSL protocol and line code and channel which corresponds with the packet contents. Data for each of the channels is passed along either path in discrete packets the headers of which identify the corresponding channel and may additionally contain channel specific control instructions for various of the shared and discrete components along either the transmit or receive path.

On the upstream path, upstream packets containing digital data from various of the subscribers is received by the DSP medium access control (MAC) 314 which handles packet transfers to and from the DSP bus. The MAC couples with a packet assembler/disassembler (PAD) 316. The operation of the DSP PAD for upstream packets is managed by controller 318. For upstream packets, the PAD handles removal of the DSP bus packet header and insertion of the device header and control header which is part of the device packet 306. (See FIG. 5). The content of these headers is generated by the core processor 334 using information downloaded from the DSLAM controller 200 (See FIG. 2) as well as statistics such as gain tables gathered by the de-framer 332, or embedded operations channel communications from the subscriber side. These channel specific and control parameters 326 are stored in memory 328 which is coupled to the core processor. The PAD 316 embeds the required commands generated by the core processor in the header or control portions of the device packet header of the upstream data packets. The upstream packets may collectively include data from multiple channels each implementing various of the X-DSL protocols. Thus the header of each device packet identifies the channel corresponding with the data contained therein. Additionally, a control portion of the packet may include specific control instructions for any of the discrete or shared components which make up the upstream or downstream processing paths. In the embodiment shown, the Fourier transform engine (FTE) 322 is a component which is shared between the upstream and downstream paths. Thus, on the upstream path each upstream packet is delivered to the FTE for demodulation. The input controller 330 handles the mapping of data and the processing of the packets as it flows through FTE. The information in the header of the packet is used by the controller 330 to maintain the channel identity of the data as it is demodulated, to setup the FTE at the appropriate parameters for that channel, e.g. sample size, and to provide channel specific instructions for the demodulation of the data. The demodulated data is passed under the control of output controller 324 as a packet to the next component in the upstream path, i.e. the deframer and Reed Solomon decoder 332 for further processing. This component reads the next device packet and processes the data in it in accordance with the instructions or parameters in its header. The demodulated, decoded and de-framed data is passed to the asynchronous transfer mode (ATM) PAD 340 operating under the control of controller 338. In the ATM PAD the device packet header is removed and the demodulated data contained therein is wrapped with an ATM header. The packet is then passed to the ATM MAC 344 for transmission of the ATM packet on the ATM network 140 (See FIGS. 1–2).

On the downstream path, downstream packets containing digital data destined for various subscribers is received by the ATM MAC 344 which handles transfers to and from the ATM network 140. The ATM MAC passes each received packet to the ATM PAD 340 where the ATM header is removed and the downstream device packet 306 is assembled. The operation of the ATM PAD for downstream packets is managed by controller 342. Using header content generated by the core processor 334 the PAD assemble data from the ATM network into channel specific packets each with their own header, data and control portions. The downstream packets are then passed to the Framer and Reed Solomon encoder 336 where they are processed in a manner consistent with the control and header information contained therein. The Framer downstream packets are then passed to the input of the FTE. The control 330 governs the multiplexing of these downstream packets which will be modulated by the FTE with the upstream packets which will be demodulated therein. Each downstream packet with the modulated data contained therein is then passed to the DSP PAD. In the DSP PAD the device packet header and control portions are removed, and a DSP bus header 304 is added. This header identifies the specific channel and may additionally identify the sending DSP, the target AFE, the packet length and such other information as may be needed to control the receipt and processing of the packet by the appropriate AFE. The packet is then passed to the DSP MAC for placement on the DSP bus 216 for transmission to the appropriate AFE.

FIG. 3 also shows a more detailed view of the processing of upstream and downstream packets within the AFE. In the embodiment of the invention shown, device packets are not utilized in the AFE. Instead, channel and protocol specific processing of each packet is implemented using control information for each channel stored in memory at session setup.

Downstream packets from the DSP are pulled off the bus 216 by the corresponding AFE MAC on the basis of information contained in the header portion of that packet. The packet is passed to AFE PAD 346 which removes the header 304 and sends it to the core processor 372. The core processor matches the information in the header with channel control parameters 362 contained in memory 360. These control parameters may have been downloaded to the AFE at session setup. The raw data 302 portion of the downstream packet is passed to FIFO buffer 352 under the management of controller 350. Each channel has a memory mapped location in that buffer. The interpolator and filter 358 reads a fixed amount of data from each channel location in the FIFO buffer. The amount of data read varies for each channel depending on the bandwidth of the channel. The amount of data read during any given time interval is governed by the channel control parameters 362, discussed above. The interpolator upsamples the data and low pass filters it to reduce the noise introduced by the DSP. Implementing interpolation in the AFE as opposed to the DSP has the advantage of lowering the bandwidth requirements of the DSP bus 216. From the interpolator data is passed to the FIFO buffer 368 under the control of controller 366. The downstream packets 370 may increase in size as a result of the interpolation. The next module in the transmit pipeline is a DAC 378 which processes each channel in accordance with commands received from the core processor 372 using the control parameters downloaded to the control table 362 during channel setup. The analog output of the DAC is passed via analog mux 384 to a corresponding one of sample and hold devices 386. Each sample and hold is associated with a corresponding subscriber line. The sampled data is filtered in analog filters 390 and amplified by line amplifiers 394. The parameters for each of these devices, i.e. filter coefficients, amplifier gain etc. are controlled by the core processor using the above discussed control parameters 362. For example, where successive downstream packets carry downstream channels each of which implements different protocols, e.g. G.Lite, ADSL, and VDSL the sample rate of the analog mux 384 the filter parameters for the corresponding filter 390 and the gain of the corresponding analog amplifiers 394 will vary for each packet. This "on the fly" configurability allows a single downstream pipeline to be used for multiple concurrent protocols.

On the upstream path many of the same considerations apply. Individual subscriber lines couple to individual line amplifiers 396 through splitter and hybrids (not shown). Each channel is passed through analog filters 392, sample and hold modules 388 and dedicated ADC modules 380–382. As discussed above in connection with the downstream/transmit path, each of these components is configured on the fly for each new packet depending on the protocol associated with it. Each upstream packet is placed in a memory mapped location of FIFO memory 374 under the control of controller 376. From the controller fixed amounts of data for each channel, varying depending on the bandwidth of the channel, are processed by the decimator and filter module 364. The amount of data processed for each channel is determined in accordance with the parameters 362 stored in memory 360. Those parameters may be written to that table during the setup phase for each channel.

From the decimator and filter the raw data 302 is passed to FIFO buffer 354 which is controlled by controller 356. Scheduled amounts of this data are moved to PAD 348 during each bus interval. The PAD wraps the raw data in a DSP header with channel ID and other information which allows the receiving DSP to properly process it. The upstream packet is placed on the bus by the AFE MAC 346. A number of protocols may be implemented on the bus 216. In an embodiment of the invention the DSP operates as a bus master governing the pace of upstream and downstream packet transfer and the AFE utilization of the bus.

Figure 4:
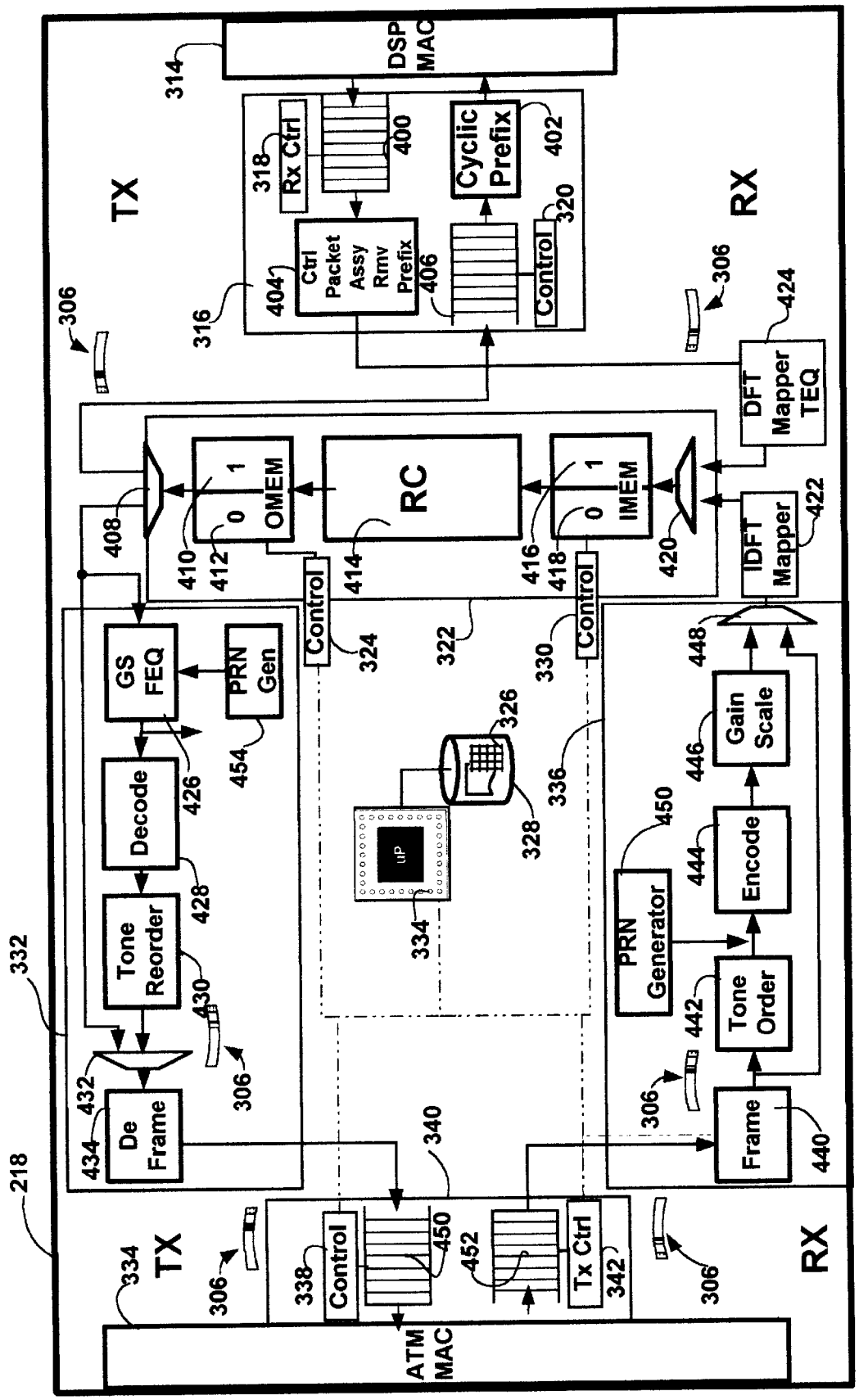
FIG. 4 is an expanded hardware view of the digital signal processor portion (DSP) of the line card shown in FIG. 3.

FIG. 4 is an expanded hardware view of the digital signal processor portion (DSP) of the line card shown in FIG. 3. Submodules of each of the DSP Pad 316, the FTE 322, the Deframer-decoder 332, the framer-encoder 336 and the ATM PAD 340 are shown.

On the upstream (receive) packet path, the DSP PAD includes a first-in-first-out (FIFO) buffer 400 where upstream packets from the AFEs are stored. Any cyclic prefix is removed by the control packet assembler 404 which also injects header and/or control information into the packets to control their demodulation by each of the demodulation components. After removal of the cyclic prefix each packet is then passed to the DFT mapper 424. The DFT mapper is coupled to the input memory portion of the FTE via a multiplexer 420. The mapper handles writing of each sample set from a packet into the input memory in the appropriate order. The mapper may also handle such additional functions as time domain equalization (TEQ) filtering which is a digital process designed to normalize the impact of differences in channel response. The filter may be implemented as an FIR filter. The input memory comprises two portions 416 and 418. Multiplexer 420 provides access to these memories. While one sample set, e.g. time or frequency domain data, is being written from the upstream or downstream data paths into one of the memories the contents of the other of the memories are written into the row and column component 412 of the FTE 322. Once the DFT is completed by the row and column component, the frequency domain coefficients generated thereby are stored in either of portions 408–410 of the output memory of the FTE. These coefficients correspond with each of the DMT subcarriers. A multiplexer 408 handles the coupling of the output memory to either the next component of the upstream path, i.e. the deframer-decoder 332 or of the downstream path. Next on the upstream path, the device packet with header and data portions and optional control portion is passed to the remaining components of the upstream path. These include the gain scaler, forward error correction (FEQ) 424, pseudo random noise (PRN) generator 454, the decoder 426, the tone re-orderer 428 and the deframer 432.

A multiplexer 430 couples the deframer input to either the tone reordered 428 or to the output memory of the FTE. Each of these components is individually configurable on a per channel basis using tables stored locally in registers within each component, or within memory 328. The access to these tables/registers is synchronized by the logic in each of the components which responds to header or control information in each upstream packet to alter tone ordering/re-ordering, gain scaling constants per-tone per-channel, and FEQ constants per-tone per-channel. The processor 334 may initialize all the registers. From the deframer packets are passed to the FIFO buffer 450 which is part of ATM PAD 340.

The core processor 334 has DMA access to the FIFO buffer 450 from which it gathers statistical information on each channel including gain tables, or gain table change requests from the subscriber as well as instructions in the embedded operations portion of the channel. Those tables 326 are stored by the core processor in memory 328. When a change in gain table for a particular channel is called for the core processor sends instructions regarding the change in the header of the device packet for that channel via PAD 316. The core processor 334 then writes the new gain table to a memory, e.g. memory 326, which can be accessed by the appropriate component, e.g. FTE 322 or Gain Scalar 426. As the corresponding device packet is received by the relevant component that component, e.g. the gain scalar applies the updated parameters to appropriately scale the data portion of the packet and all subsequent packets for that channel. This technique of in band signaling with packet headers allows independent scheduling of actions on a channel by channel basis in a manner which does not require the direct control of the core processor. Instead each module in the transmit path can execute independently of the other at the appropriate time whatever actions are required of it as dictated by the information in the device header which it reads and executes.

On the downstream (transmit) path a FIFO buffer 452 within the AFE PAD 340 holds incoming packets. These are passed to the components in the Framer and Encoder module 306 for processing. The components of that module include the framer 440, tone orderer 442, PRN generator 450, encoder 444 and gain scalar 446. They are coupled via a multiplexer 448 to the IDFT mapper 422. As was the case with the deframer, the framer will use protocol specific information associated with each of these channels to look for different frame and super frame boundaries. The tone orderer supports varying number of tones, bytes per tone and gain per tone for each of the X-DSL protocols. For example the number of tones for G.Lite is 128, for ADSL is 256 and for VDSL 2048. The number of bits to be extracted per tone is read from the tone-ordering table or register at the initiation of processing of each packet. For example as successive packets from channels implementing G.Lite, ADSL and VDSL pass through the DMT Tx engine the number of tones will vary from 128 for G.lite, to 256 for ADSL, to 2048 for VDSL. In the encoder 444 constellation mapping is performed based on the bit pattern of each packet. The output is a two dimensional signal constellation in the complex domain.

Next in the IDFT mapper each device packet is correlated with a channel and protocol and mapped into input memory via a connection provided by multiplexer 420. The mapping is in a row and column order. Next in the FTE, the complex symbols are modulated into carriers or tones in the row and column transform component 414 and placed in either portion 410 or 412 of output memory. The dimensions of the row and column transforms vary on a channel specific basis as shown in the following FIG. 11C. Next a packet with the memory contents, i.e. the tone sequence is passed as a packet via multiplexer 408 to the DSP FIFO buffer 406. This is part of DSP PAD 316. Individual packets are moved from this buffer to the cyclic prefix component 402 for the addition of the appropriate prefix/suffix. The cyclic prefix component is responsive to the device packet header which identifies the channel for which data is being processed. This can be correlated with the required prefix/suffix extensions for the protocol associated with the channel on the basis of parameters 326 stored in main memory 328 or within dedicated registers in the component. For example the cyclic extension for G.Lite is 16,for ADSL 32, and for VDSL 320.

This device architecture allows the DSP transmit and receive paths to be fabricated as independent modules or submodules which respond to packet header and or control information for processing of successive packets with different X-DSL protocols, e.g. a packet with ADSL sample data followed by a packet with VDSL sampled data. A mixture of different control techniques are used to control the behavior of the individual components of the DSP. The packet header may simply identify the channel. The component receiving the packet may then reference internal registers or downloaded tables such as table 326 to correlate the channel with a protocol and the protocol with the corresponding parameters with which the data portion of the packet is to be processed. Alternately the device packet may contain specific control information such as that associated with shutting down a channel, idling a channel, or shutting down the DSP.

Figure 5:
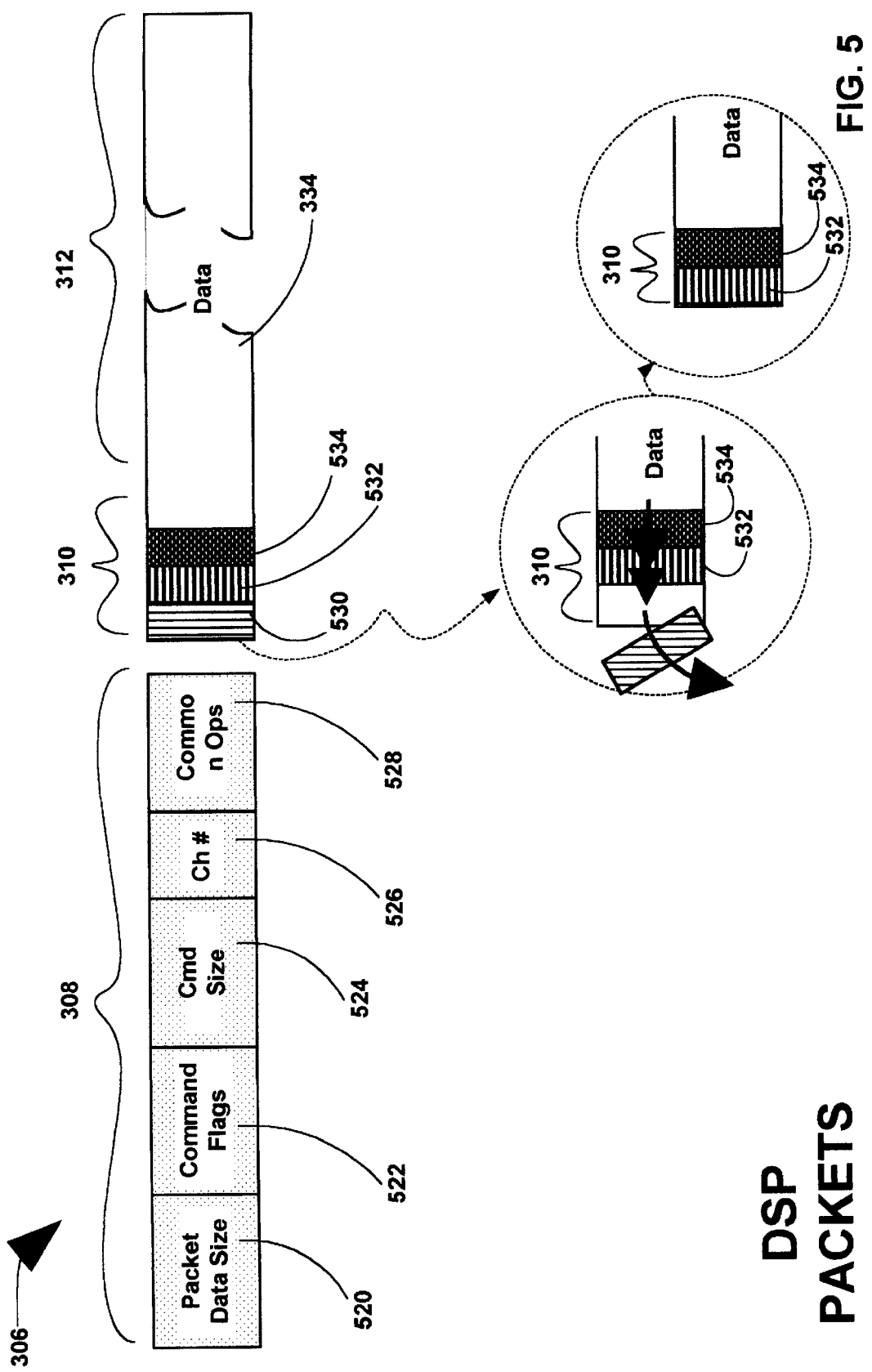
FIG. 5 shows the packet structure for passing data through and controlling the operation of various components within the DSP shown in FIG. 4.

FIG. 5 shows the device packet structure for passing data through and controlling the operation of various components within the DSP shown in FIG. 4. The device packets each include a header portion 308, a command portion 310 and a payload or data portion 312. In an embodiment of the invention the header is of a fixed length. The header in this embodiment of the invention includes five fields. Field 520 contains a value corresponding with the size of the packet. Field 526 identifies the channel associated with the packet. Field 528 indicates any common operations among modules to be performed on a channel, i.e. active, inactive, idle etc. Field 522 contains flags for each module in the associated path, i.e. transmit or receive, and a command size field 524. The command portion 310 may contain no command blocks or may contain command blocks for one or more of the modules or components on the transmit/receive path. Three command blocks 530, 532, 534 are shown.

The core processor 334 (See FIGS. 3–4) "talks" to selected modules indirectly through these packets and specifically via either the common ops field 528 or the command fields 520–524 thereof When the core processor has scheduling, setup, changeover, timing or other information for a selected module it passes the information to the module indirectly via headers for the associated channel together with the appropriate module. Thus the behavior of individual modules may be configured on the fly on a channel by channel basis.

As each module receives each packet it performs two operations on the header. An update of the packet data size is performed on every packet when the processes performed by the module, e.g. DFT or IDFT change the size of the payload. The module updates the value in field 320 with the new packet size. The other operation is only performed when the module/component receives a device packet in which its, the modules, unique flag bit in field 522 is set. If its flag bit is set, the module reads data starting from the start of the command portion 310 in an amount corresponding with the command size indicated in field 524. If the command is one to be executed on the current payload then the receiving module makes the changes and processes the payload data 534. If the command sequence is to be performed on a subsequent packet then the module logs the command and frame reference and executes it at the appropriate frame. After reading the command and processing the data, and before transferring the processed device packet to the next module in the queue the detecting module performs the following operations. It deletes its command information effectively by writing the packet out with the succeeding command blocks 532–534 moved from the second and third positions to the first and second positions within the command portion (See detailed views). Then the component updates both the command size in the command size field 524 as well as the packet data size 520.

Figure 6:
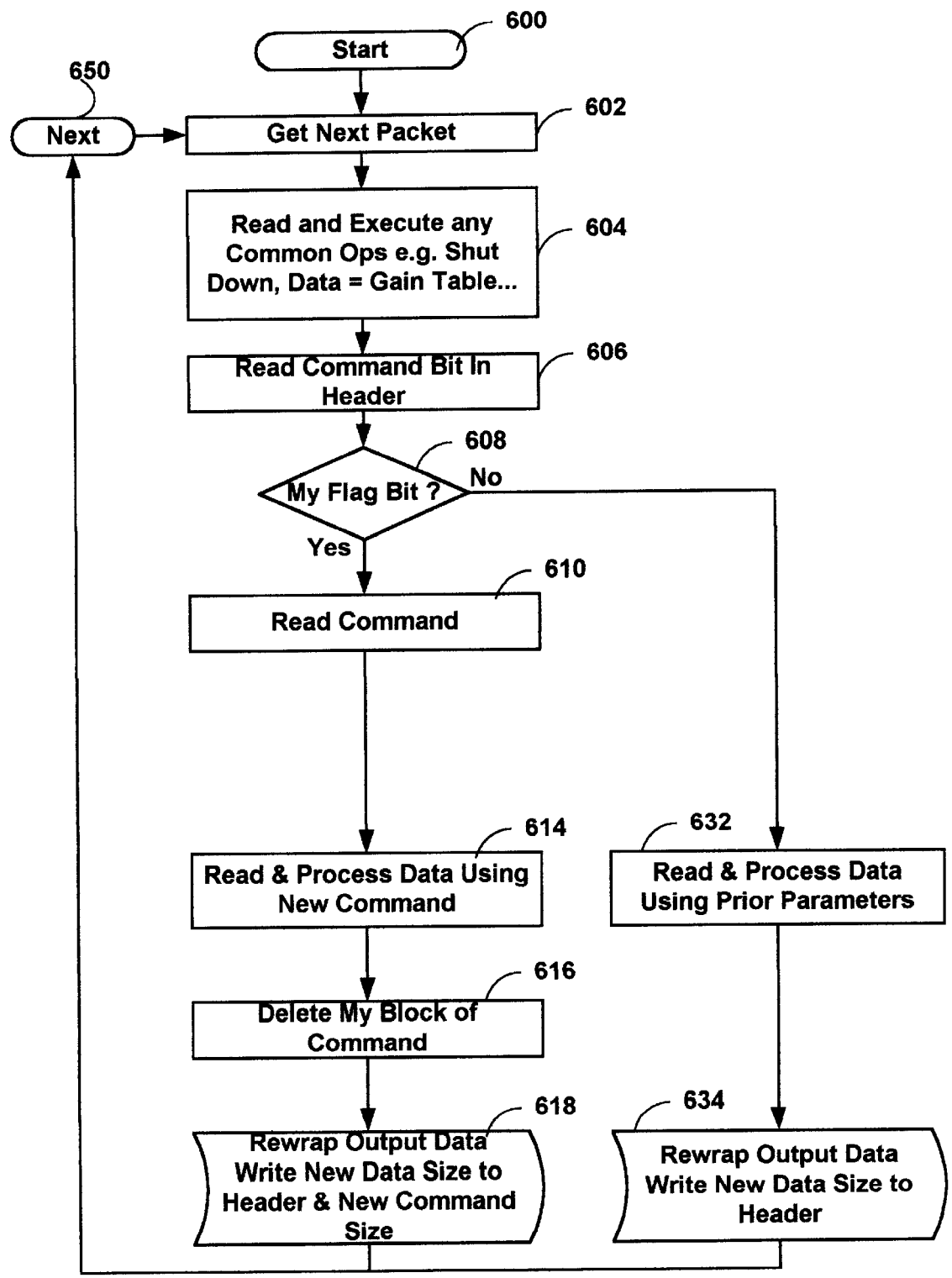
FIG. 6 is a process flow diagram showing the operation of various shared and dedicated components within the DSP in response to the receipt of a upstream or downstream packet.

FIG. 6 is a process flow diagram showing the operation of various shared and dedicated modulation and demodulation modules within the DSP in response to the receipt of upstream or downstream device packets 306. Each of the shared and dedicated components/modules responds to header and control information in the device packets to reconfigure its process parameters for processing of the data portion 312 of the device packet. Device packets may in alternate embodiments of the invention be implemented on either the DSP or the AFE should timing, scheduling, scalability etc. make it advantageous to do so. Processing begins in start bock 600 in which control is passed to process 602 for the receipt of the next packet. Next in process 604 the common ops field 528 (See FIG. 5) is read to see if there are any common ops in the header to be executed. Common ops include a state change for a channel, e.g. active-to-inactive/idle. Then in process 606 the command bit in command flag field 522 is read. If in decision process 608 a determination is made that the flag bit for the corresponding module is not set then that module executes process 632. In process 632 the device packet is processed using parameters previously associated with the channel in main memory 328

(See FIGS. 3–4) or in a memory/register associated with the component. These parameters may be downloaded or fixed part of memory. Next the module updates the header with the new data size in field 520 and passes the packet to the next submodule, module or FIFO buffer. Alternately, if in decision process 608 a determination is made that the flag bit for the module is set, then control is passed to process 610 in which the command is read. Control then passes to processes 614–618. In process 614 the command is acted on or stored for action on a later packet. This later feature permits synchronization with other modules. Next in process 616 the command for the component is deleted from the command block and any remaining commands rewritten, e.g. moved forward in the command portion 310. Then in process 618 the updated device packet with processed data and updated header information, e.g. packet size, is assembled and passed to the next component. This approach has the advantage of avoiding detailed timing, synchronization and control of the individual modules. Each component may be individually configured using either in packet or out of packet control techniques.

Figure 7:
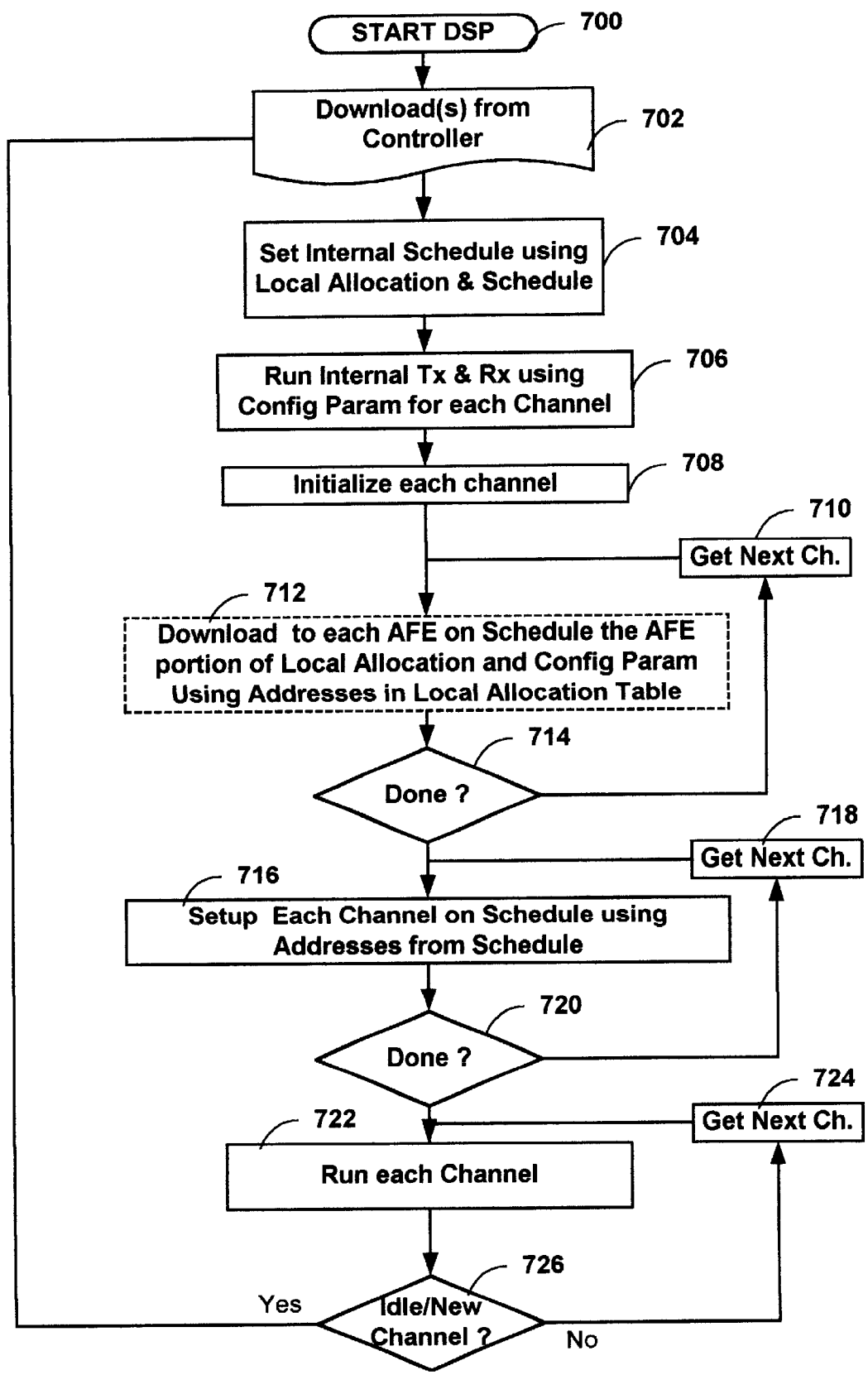
FIG. 7 is a process flow diagram of representative processes executed by the DSP shown in FIG. 4.

FIG. 7 is a process flow diagram of representative processes executed by the DSP shown in FIG. 4. Processing begins at process 700 subsequent to which downloads 702 from the DSLAM controller of the Local Allocation and Configuration parameter tables is accomplished. Next in process 704 the DSP sets an available process time slot for the allocated channel(s) using resident or downloaded parameters associated with the specific protocol, e.g. G.Lite, ADSL, VDSL, required to support the channel. Then Tx & Rx modules are activated in process 706. Then control is passed to process 708 to initiate each channel. Control then passes to process 712 for the download to each AFE of the local allocation and configuration tables relevant to the target AFE. If all channels have been provisioned in a corresponding targeted AFE(s) then decision process 714 passes control to the setup phase for each channel in process 716. If alternately, provisioning is not complete control returns via process 718 in which the local allocation and configuration parameter tables for the next channel and its associated target AFE are downloaded.

The setup of each channel occurs in process 716 using configuration parameters appropriate to whichever XDSL protocol the channel will implement. Until this is complete control is returned by decision process 720 to next channel process 718 until all channels have been setup.

Control then passes to process 722 in which transmit and receive operations are conducted in round robin or other repetitive fashion for each channel. Either a new channel or an idle detection among existing channels will be detected in decision process 726 in which event control will be passed to process 702 for the download of new allocation and configuration parameters from the DSLAM controller.

Synchronization & Control of Data-flow in an X-DSL Modem

The data flow in the BME follows a fixed path in normal run/show time operation. On the transmit path, data enters from the ATM side 344 (See FIG. 3) and flows through the TC layer (ATM processing, CRC, Scrambler, RS encoder, interleaver) and the PMD layer (tone ordering bit extraction, gain scaling, IFFT, cyclic extension), and is sent out at the AFE interface, i.e. PAD 316. During the various phases of the initialization, the modem needs to go through various states before reaching the show time state. Each of these states has different processing requirements, and thus the data flow is different in the various states. For example, the framer and interleaver are turned off in the initialization states. In addition, the state change needs to be performed at a specific time in the future (at a frame or super-frame boundary). Further, even in show time, there is a need to associate some control/status information with the data (such as the channel number to which the block of data flowing through belongs to), as well as changes in operation are sometimes required (bit-swap, rate-adaptation or rate re-partitioning). Thus some control information (such as state change, channel number, operation indicators etc.) which affects the behavior of the module needs to be transferred from module to module. The control information has to be associated with a block of data and thus needs to be synchronized with the data flow.

The control synchronization requires synchronizing a state change (change in behavior of operation of the modules) to a specific time, which is specified as a symbol boundary. In ADSL, symbol boundaries in show time, occur every 544 samples on the transmit path, and every 68 samples on the receive path (approximately every 246 micro-seconds). The state change occurs at slightly different times in each module in the data path. For example, on the transmit path, the state change occurs first in the framer which handles the TC layer, and a short time later, when the data from the framer reaches the PMD layer, then the PMD layer should change its behavior to the new state mode. The control should be performed on a channel basis, since different channels can be in different states at any given time. The packet-based transport mechanism of the current invention combines the control information with its associated data. Thus a packet can be sent from module to module passing data and control information concurrently. The packet header contains control information, followed by the data.

On the transmit path, the core central processing unit (core Cpu) 334 (See FIG. 3) controls the transmit controller 342 and the framer 440. The framer module creates the packet for the transmit data path. The framer 440 and the transmit controller 342 could be separate or in an embodiment of the invention, could be combined as a single module. In the remaining part of the description, the transmit controller plus framer are together referred to as just the framer.

The control of the framer by the core Cpu 334 will be described in the following. The packet is created by creating a packet header based on channel's settings and appending output data to this header. The packet header consists of a basic packet header and an optional extended commands part. The transmit direction packet will in an embodiment of the invention contain the following information.

| Field | Size | Comments |
| --- | --- | --- |
| Packet Header | 6 bytes | Basic channel control information, size of data part, size of extended command part, and indication of which modules have extended commands. |
| Extended Commands | Variable (this part is optional, i.e., size can be zero) | Each module interprets its extended command part if it is present. |
| Data | Variable | Each module reads the data and replaces with its output. |

The processor 334 controls the header 308 (See FIG. 5) creation at the framer 440 and thereby controls operation of other modules. The processor can perform the transition from a initial state to show time state by setting the framer to change the packet header (incl. Extended commands part)

at a particular frame number, and thereby changing the operation of all the modules in the transmit path.

In a similar manner, the processor 334 controls the header creation and packet formation at the receive controller 318 and DSP PAD 316. The processor can perform transitions of the receive path operation by setting the receive controller to change the packet header (incl. Extended commands part) at a particular frame number, and thereby changing the operation of all the modules in the transmit path.

Alternately, the processor could be configured to set up frame counters in each module to change behavior at a frame number, which would require each module to compare frame numbers. In the current embodiment, the framer tracks the frame number and initiates the state change on the transmit path and the receive controller does the same for the receive path. Then, as the data flows through the modules, the new state is indicated in the header, which causes the state change to be correctly propagated to the modules.

The packet-based scheme simplifies synchronization of control information with the corresponding data; avoids duplication of some channel-based information in more than one application specific integrated circuit (ASIC) module of the transmit or receive path, and allows a simple flexible control scheme which can be extended quickly to support new requirements, as new features are added.

The Core processor 334 maintains the modem state machine and co-ordinates the activities between the transmit and receive paths. For example, in certain stages of initialization, the modem is required to wait for and receive a particular tone sent by the remote side, and then change its transmitted output. At other times during Showtime, the modem will receive an embedded message from the other side (such as requesting a change in data rate or other modem parameters), and then respond by transmitting an appropriate reply.

Control of Framer by Core Cpu

The architecture is designed to be scalable and support a large number of channels, by following a distributed hierarchical control scheme. The top-level intelligent decision making is performed by the core Cpu 334. The low-level control details which are to be done on a per-frame basis are offloaded to a Transmit-path controller 342 and framer 440 on the transmit path and to a Receive-path controller 318 and packet assembler and prefix remover 404 on the receive path. These "secondary-level" controllers can be implemented as fixed-function ASIC blocks with configurable control registers, or as simple micro-controllers. In the current embodiment of the invention micro-controllers are used to provide the flexibility of software-based control. The framer 440 includes a transmit path micro controller 904 which performs the X-DSL standard framing of the transmit data.

The core Cpu specifies the operations (control of the ASIC blocks on the transmit path) to the framer 440 Cpu 904. The framer Cpu then performs the low-level frame by frame control of the modules in the transmit path for all channels by creating the packet header for each channel and initiating the transmission of a frame of data for each channel through the transmit path, at the correct frame rate. The framer Cpu 440 maintains the frame counter for each channel in the status list 902 in memory 906. The framer also does low level temporary state changes which have a fixed repeating pattern (and thus do not require much intelligent decision making): e.g. in Showtime for ADSL, a synchronization frame is sent after every 68 frames of data. The Framer Cpu loads the packet header which contains the control information for the normal operation packet header for the 68 frames, and then the packet header for the sync frame operation for the $69^{th}$ frame and this pattern is repeated continuously.

Look-ahead Control

The framer 440 waits for messages, e.g. message 910 for channel #0, from the core Cpu 334 which can indicate a new state (new packet header is to be created) or a finer control (change in some part of the header). The messages are stored in a message queue 900. The core Cpu also specifies a frame number at which to perform the state change, with the framer maintaining a frame counter for each channel in the corresponding channel status list, e.g. status list 912 for channel #0, which is incremented after it sends data for a frame. This offloads a lot of processing from the core Cpu, since it does not have to monitor the frame counter of each channel, and wait until the correct frame before sending the command to the framer. Instead, the core Cpu determines the frame number where the change is to occur, and sends the command down to the framer. The core Cpu is then free to perform operations for the other channels. The state changes typically occur at a fixed duration after some event, and can thus be determined in advance. This method thus provides the core Cpu a large window of time in which to make the decision (of the next state) and then send the decision to the framer. The framer can also be instructed to stop transmitting on a channel, in which case, it does not originate any packet for that channel.

Transmit Path Packet Header Details

The packet now consists of the following three parts (See FIG. 5):

Packet Header 308 (Fixed size): this consists of the information needed during normal show time operation, which will be the mode of operation for most of the time.

Extended Command block 310 (Variable size): this contains the commands that are not frequently used. This part is optional (i.e., size can be 0).

Data block 312 (Variable size): this contains the data to be operated upon. The size of the data changes, since the data will be operated on the block, and the output size is not the same for all blocks.

The various parts of the packet header 308 (See FIG. 5) are described below. In the description below, the locations of various fields is specified as a byte number within a block of bytes, where byte 0 is transmitted first, and byte number 'n' is transmitted before byte number 'n+1'. The locations within a field are described as bit positions, where bit 0 is the 1 sb bit. The packet header consists of the following fields:

| FIELD NAME | LOCATION | COMMENTS |
| --- | --- | --- |
| PktDataSize | 16 bits (bytes 0,1) | Size of Data part in bytes (most significant byte of PktDataSize is in byte 0 of packet header) |
| ExtCmdFlags | 8 bits (byte 2) | Indicates which modules have extended commands |
| ExtCmdSize | 8 bits (byte 3) | Size of Extended Command part in bytes |
| ChNum | 8 bits (byte 4) | Channel Number |
| PktTxOps | 8 bits (byte 5) | Transmit path Operations, needed in show time mode |

The ExtCmdFlags has a bit per major module to indicate if that module has any extended commands. The extended command block has the extended command areas for the modules, sequentially in the order, in which the modules occur in the data flow. For example, the transmit direction packet which contains extended commands for Mapper, Z-fifo controller, Afe-interface, would contain extended commands for the Mapper, followed by the extended commands for the Z-fifo controller, and then the Afe-interface.

The extended commands 310 (See FIG. 5) are processed by each module as the packet flows through the module. A module checks if there is any extended commands for it (checks if its bit is set in the ExtCmdFlags field). The module interprets and then discards its extended commands, and sends the remaining extended command bytes to its successor. The module will reduce the 'ExtCmdSize' field in the packet header by the size of the commands for that module, before writing the packet header out. Since each module discards its extended commands, when a module has an extended command, it will start after the last byte of the packet header. Thus, when the packet arrives at a module, the extended commands for that module, if it exists, will be at the start of the extended commands block. The size of the extended command part for a module is a fixed size. Thus for each module, the position and size of its extended command part is fixed, thereby simplifying the operation. FIG. 5 shows the various parts of the packet header.

Packet Processing Functions

Each module should support the following packet processing functions to enable the packet-based control of the ASIC blocks which form the transmit path and receive path of an embodiment of the current invention. Each module accepts the packet data from its predecessor, performs the required operations and passed it on to its successor.

If a module has an extended command part, then it should perform the extended command operations, discard its own extended commands, and forward the rest of the extended commands (if any remain) to the next module. The 'ExtCmdSize' field should be reduced by the number of bytes discarded. Typically, the first module in the path creates the packet, and the last module in the path deletes the packet (i.e., does not forward it anymore). The architecture does not prevent a module in the middle from either creating a new packet, or deleting a packet. The first module in the transmit path is the Framer (consisting of framer Cpu plus accelerator), and the last module is the AFE-interface.

If the packet header indicates the module is bypassed, then it should forward the entire packet to its successor without any modifications.

Examples of Packets & Messages During State Changes

Figure 8:
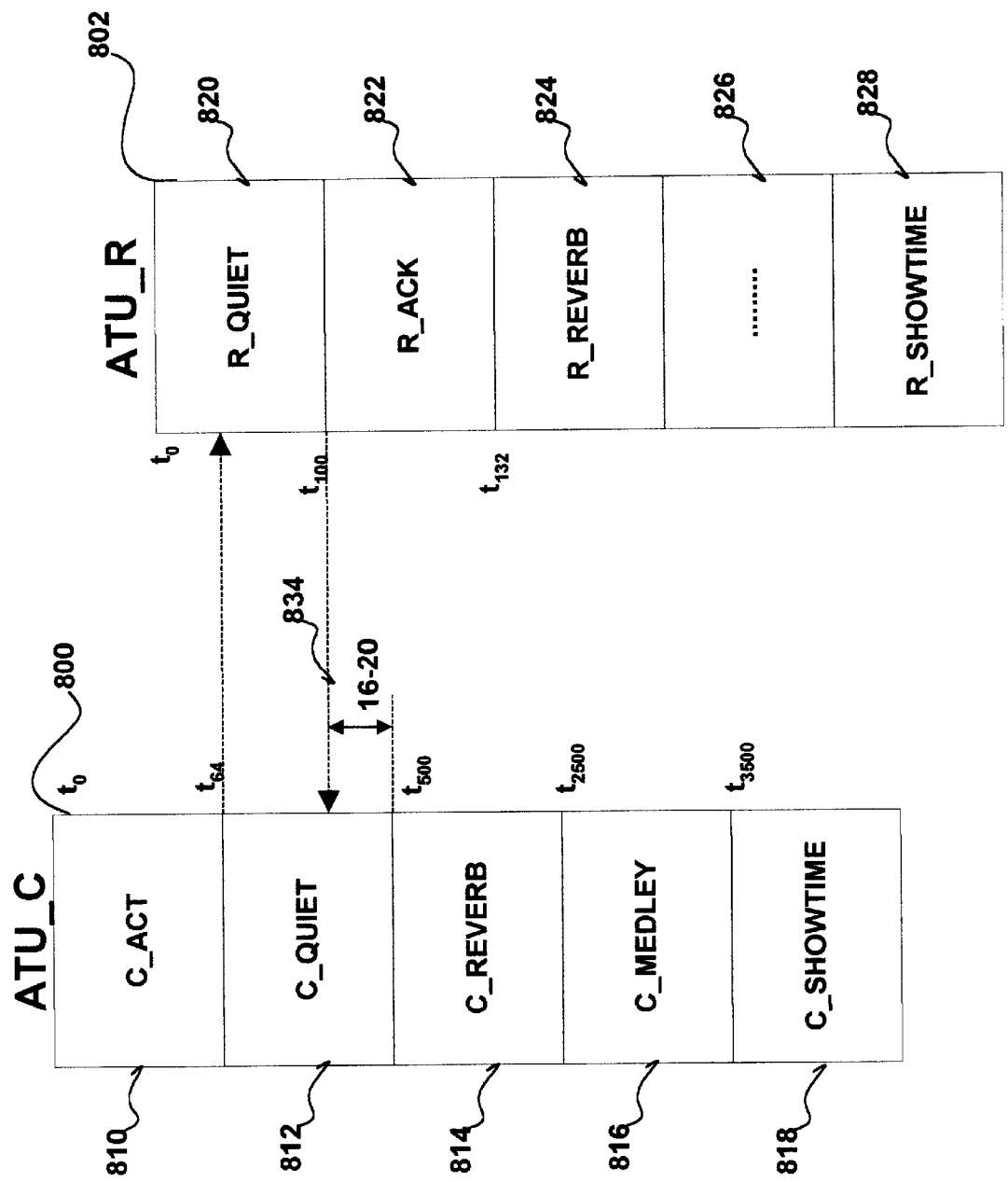
FIG. 8 is a candlestick diagram showing various representative phases of the setup/startup phase of the modem operation, with required synchronization between transmit and receive paths.

FIG. 8 shows a redacted form of the sequence of operations associated with the setup/initialization phase of modem operation for the transmit path 800 and corresponding receive path 802. During initialization, the modem goes through a series of state transitions, before it reaches Showtime state, at which point, the user data can be transmitted between the two sides. The behavior of the modem is different in each of the states, and thus the operation of the ASIC blocks must be modified, at each state transition. For each transition, the messages and packets generated are shown. Representative fields to that state are shown. The sequence of transitions shown in FIG. 8 is used as an example—the actual sequence varies from standard to standard is typically much longer.

In the example initialization sequence shown, the ATU_C modem starts in state C_ACT, in which it transmits a single tone at frequency of 207 KHz for a fixed duration of 64 symbols. After this, the ATU_C enters the C_QUIET state, in which it does not transmit anything (transmit signal is zero). The ATU_R modem waits for the ATU_C to transition from C_ACT tone to C_QUIET. Then after some number of frames (within a maximum limit of 2000 frames), the ATU_R modem sends the R_ACK tone. On receiving the R_ACK tone, the ATU_C must transition to the C_REVERB state within 16 to 20 symbols. The ATU_C transmits a fixed pseudo-random (specified in the standard) modulated using 2-bit constellation on all the tones. The C_REVERB state is maintained for a fixed duration of 2000 symbols, after which it transitions to C_MEDLEY. The C_MEDLEY state is maintained for 1000 symbols, after which it transitions to C_SHOWTIME, at which point, the user's data is read from the ATM interface and then modulated on the tones and transmitted. This example sequence is intended for the purpose of illustrating how the state transitions are performed in the current invention. The example shows the state transitions occurring: a) after a fixed duration (such as C_ACT to C_QUIET after 64 symbols), and b) after receiving a signal from the other end (such as C_QUIET to C_REVERB). The actual state transitions of each of the X-DSL standards vary from one another, and are therefore stored in standards list in memory 328 for use in implementing any of the protocols.

Figure 9A:
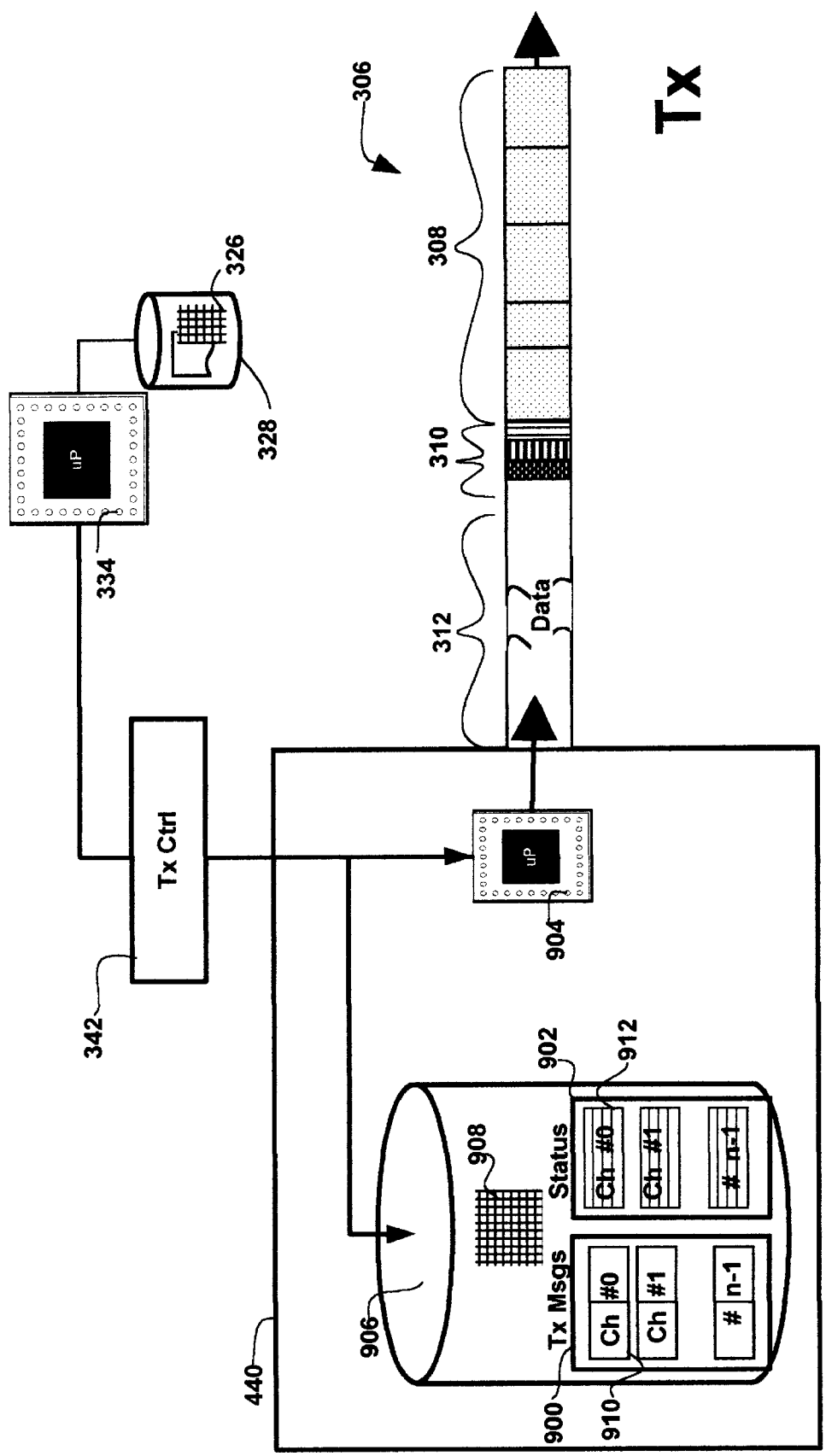
FIGS. 9A–B show the data structures used by the DSP to control various modules in the transmit and receive paths respectively.
Figure 9B:
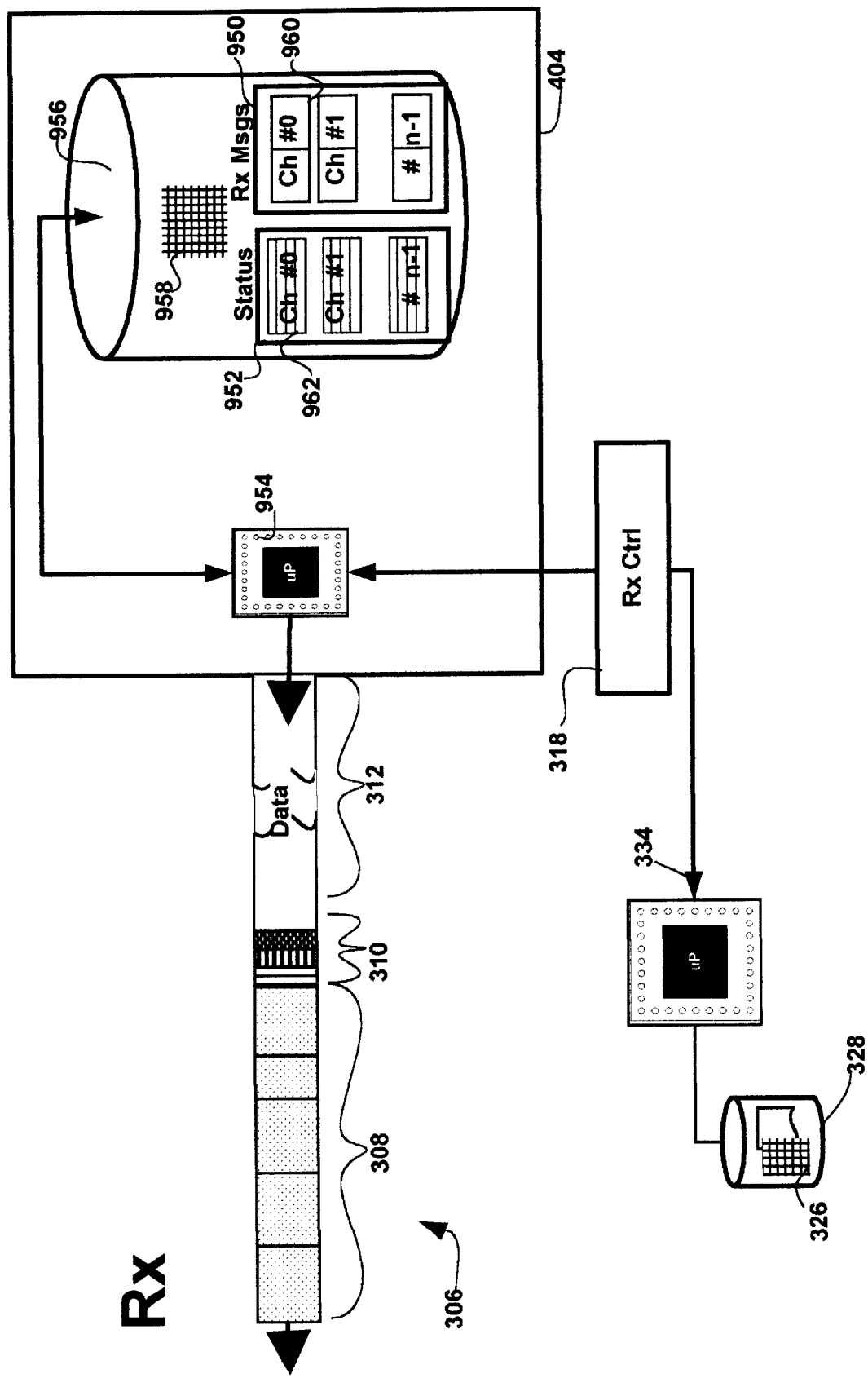

As shown in FIG. 9A the core Cpu 334 controls the Tx Controller 342 and framer 440 (specifically, the framer Cpu 904 in this embodiment of the invention) by sending a 'TxCtlMsg' (transmit control message). Similarly, as shown in FIG. 9B, the core Cpu 334 controls the operation of the ReceiveController 404 (See FIG. 4) by sending a 'RxCtlMsg' (receive control message).

The Framer 440 based on the TxCtlMsgs it received, will build up a list of active channels 908, and for each channel, a queue of pending TxCtlMsgs 910 and a status structure 912. Similarly, the receive controller 404 based on the RxCtlMsgs it received, will build up a list of active channels 958, and for each channel, a queue of pending RxCtlMsgs 960 and a status structure 962.

The Framer 440 then creates a 'TxPkt' (transmit packet) 306 and sends it down the transmit path. The TxPkt controls the operation of the modules in the transmit path. The TxPkt can be a subset of the TxCtlMsg, in which case, it can be extracted by the framer and sent. Alternately, the two structures could be different, with the framer creating the TxPkt based on the information in the TxCtlMsg and other state information—in this embodiment, the TxCtlMsg size can be minimized as the framer has the intelligence to automatically create some of the packet header fields. In either case, once the state transition has occurred, the framer operates independently for the successive frames and sends appropriate packet headers until the next state transition is to occur. Sometime before the next transition is to occur, the core Cpu 334 (See FIG. 3) sends a TxCtlMsg to the framer which indicates the new state and the new frame number at which to transition.

The framer and/or transmit controller 342 keeps an active channel list 908 of channels in its memory 906 indicating the order in which the channels are to be operated on and the bandwidth allocated to each channel (in each frame period). It also keeps a queue 900 of setup parameters, e.g. TxCtlMsg entries on a channel basis, as shown in FIG. 9. This list contains the appropriate setup sequence and timing for each of the modules in the transmit path and for all the X-DSL protocols supported by the DSP 218. The framer also maintains the current status of each channel in a Channel-status list 902, which holds among other items, the Current Frame Number, the current state, and the current packet header to be sent. For a N channel modem, there will be N queues of setup parameters TxCtlMsg and N Channel-status records within the channel-status list. In the embodiment of the invention shown a master-slave embodiment of the control of active channels and the setup of sessions is implemented with the core Cpu in master status to the control 342 and the Framer 440. The core Cpu 334 memory contains a protocol list of setup procedures for each of the supported X-DSL protocols. The core Cpu determines which channels are active by setup messages which it sends to the framer and which form the setup parameter queue 900. The Framer constructs and initiates the setup parameter queue and the channel-status list and active channel lists accordingly. In an alternate embodiments of the invention other management models, e.g. peer-to-peer and distributed could be implemented for managing the packet based communications using the same control structures without departing from the scope of the invention. In these alternate embodiments of the invention the control structures, e.g. active channel list 908, setup parameters 900 and channel status list 902 may be found exclusively at the level of the core processor 334 or distributed down the line of command to the Tx controller 342 and/or the framer cpu 904.

FIG. 9A shows the Tx Message queue memory 900 with a queue of TxCtlMsgs 910 per channel, and a status structure memory 902 with a status structure 912 per channel. Messages TxCtlMsg arrive from the core Cpu 334 and are inserted into the queue 900. At each frame boundary, the framer receives a signal. On receiving this signal, the framer, then services each channel one after another, in the sequence indicated by a channel order list. For each channel, it checks if there are any TxCtlMsg for that channel. If the TxCtlMsg indicates that it is to be done 'ASAP', or if the frame number in the message matches the Current Frame Number in the channel's status structures, then the state is changed (a new packet with different settings is created and sent). Otherwise the current state is maintained (existing packet with no changes or minor changes is sent).

The core cpu 334, the transmit controller 342 and the framer 440 operate as a transmit path packet assembler for packetizing digitized data from a plurality of communication channels from the ATM network 140 (See FIG. 2) into corresponding transmit packets. Collectively these same modules inject transmit control parameters in the header and/or control portions of the selected ones of the packets to control the modulation of each packet by the modulation modules, e.g. framer encoder 336 and FTE 322 and sub-modules thereof on the transmit path.

The subsequent paragraphs describe the operation of the transmit path of the ATU_C modem as it performs the various transitions shown in the example initialization sequence. The receive path operation of the ATU_C is described later.

Initial Operation Before Channel Is Started

Initially the channel is set as Disabled state (on power-up) in the framer's state structures. The framer when it sees that the channel is in disabled state, does not send any packet for that channel. Thus the later modules (mapper, IFFT, etc.) do not produce any data for this channel, which means that no data is sent out on the channel.

The following text describes the operation of the core Cpu 334, framer 440, mapper 422, and cyclic prefix 402 through the redacted startup/initialization phase of operation shown in FIG. 8.

Start Modem Transmit Operation in C_ACT State 810 (See FIG. 8)

Operation of Core Cpu

The following TxCtlMsg is sent.

| TxCtlMsg from core Cpu to framer |
|---|
| ChangeState at Frame Number = −1<br>Channel Number = K<br>New State = Single_Tone_State<br>Command Fields:<br>    Change_state_ASAP = 1<br>    Reset_Frame_Counter = 1<br>    . . .<br>Data:<br>    Tone = 48<br>    Real_value = R<br>    Imag_value = I |

Operation of Framer

The framer sees the change state ASAP bit and performs the state change, and resets its frame counter. It then creates the following TxPkt and sends it to the next module on the transmit data flow path. After sending the packet for the channel for that frame, the channel's Current Frame Counter field is incremented.

| TxPkt sent on transmit path |
|---|
| Packet Header<br>    Channel Number = K<br>    Extended Cmd Flag: Mapper<br>    Basic Tx Op: Cyclic_Prefix_Off<br>    . . .<br>Extended Commands:<br>    Current State = Single Tone State<br>    . . .<br>Data:<br>    Tone = 48<br>    Real_value = R<br>    Imag_value = I |

Operation of Mapper

The Mapper sees that it is a single tone state, and generates a special case input to the FFT engine 322 (See FIG. 4): all the IFFT inputs are set to 0, except the specified tone number 48 (i.e., input number 48) which is set to given complex value (real, imaginary). The FFT engine then performs an IFFT, resulting in a time domain signal which is a single tone. Tone #48 is the $48^{th}$ bin, and with a tone spacing of 4.3125 KHz, this produces a tone at the frequency of 48 * 4.3125=207 KHz.

Operation of Cyclic Prefix

The cyclic prefix module 402 (See FIG. 4) sees that the packet header indicates that the cyclic prefix is to be kept off, and thus it passes the data through without adding any cyclic prefix. This data then goes into a Fifo, and then later is transmitted out (after any required filtering and interpolation) by the AFE.

Change to C_OUIET State 812 (See FIG. 8)

Operation of Core Cpu

The example initialization sequence requires the state to be changed to C_QUIET 812 after 64 frames. Thus the core Cpu sends the following TxCtlMsg to specify that the state change is to be done after 64 frames.

| TxCtlMsg from core Cpu to framer |
| --- |
| ChangeState at Frame Number = 64
Channel Number = K
New State = Single_Tone_State
Command Fields:
   Change_state_ASAP = 0
   Absolute_Frame_count = 1
   Reset_Frame_Counter = 0
   . . .
Data:
   Tone = 1
   Real_value = 0
   Imag_value = 0 |

Operation of Framer

The framer cpu 904 sees the change state ASAP bit is Off, and thus it keeps this message in its message queue 900. It checks every frame, if the frame number in the TxCtlMsg matches the channel's Current Frame Number field, and keeps sending the C-ACT1 state's packet, and increments the Current Frame Number. After 64 frames, the channel's Current Frame Number will match the frame number in the TxCtlMsg, and it performs the state change. Note that frame counter will not be reset here. The framer stores the frame number at which the most recent state transition occurred, so it saves the frame number at which the first frame of this new state (frame number 64) is sent in the corresponding channel status record, e.g. record 912 in status list 902. It then creates the following TxPkt and sends it to the next module on the transmit data flow path.

| TxPkt sent on transmit path |
| --- |
| Packet Header
   Channel Number = K
   Extended Cmd Flag: Mapper
   Basic Tx Op: Cyclic_Prefix_Off
   . . .
Extended Commands:
   Current State = Single_Tone_State
   . . .
Data:
   Tone = 1
   Real_value = 0
   Imag_value = 0 |

Operation of Mapper

The Mapper 422 sees that it is a single tone state, and generates a special case input to the FFT engine 322: all the IFFT inputs are set to 0, except the specified tone number 1 (i.e., input number 1) which is set to given complex value (real, imaginary). Since the given value is (0,0), all the inputs are zero. This is a special case of the single tone state, where all inputs are made zero, so that the output of the IFFT will be zero.

Operation of Cyclic Prefix

Cyclic Prefix 402 remains Off as indicated in the packet header.

Change to C_REVERB State 814 (See FIG. 8)

Operation of Core Cpu

The example initialization sequence requires the modem to wait for the other side to respond with an R_ACK 834, and then within 16 to 20 frames after receiving that, to change state to C_REVERB. Thus the core Cpu 334 waits for the R_ACK to be detected from the receive path (described later) and once it is detected, it sends the following TxCtlMsg to specify a state change with a relative frame number (to be a specified number of frames later than the next frame). The core Cpu accounts for the frames in transition through the transmit path (transmit path latency) while calculating the relative frame count. For example, if it is desired to change state 16 frames after receiving a signal, and if the latency in the transmit path is 2 frames, then the state change is to be specified as 14 frames later as shown below.

| TxCtlMsg from core Cpu to framer |
| --- |
| ChangeState at Frame Number = 14
Channel Number = K
New State = Reverb_State
Command Fields:
   Change_state_ASAP = 0
   Absolute_Frame_count = 0
   Reset_Frame_Counter = 0
   . . .
Data:
   Pseudo_Rand_Gen_Mask
   Pseudo_Rand_Gen_Start_State |

Operation of Framer

The framer 440 sees the Absolute_Frame_count bit is Off, and it adds the specified frame number to its Current Frame Number and then writes the resultant number into the Frame Number field of the message. The framer thus converts the relative frame number into an absolute one, and then puts the message in its message queue. After 16 frames, the channel's Current Frame Number will match the frame number in the TxCtlMsg, and it performs the state change. It then creates the following TxPkt and sends it to the next module on the transmit data flow path.

| TxPkt sent on transmit path |
| --- |
| Packet Header
   Channel Number = K
   Extended Cmd Flag: Mapper
   Basic Tx Op: Cyclic_Prefix_Off
   . . .
Extended Commands:
   Current State = Pseudo_Rand_Gen_State
   Save_Pseudo_Rand_State = 1
   Pseudo_Rand_Gen_Mask
   Pseudo_Rand_Gen_Start_State
Data: |

The Reverb state 814 requires the Pseudo-random generator 450 state to be reset at the start of each frame. Thus the framer sends the same 'Pseudo-Random-Gen Init_State' value to the Mapper (which contains the pseudo-random generator) for each frame of the Reverb state.

Operation of Mapper

The Mapper 422 sees that it is a Pseudo-random generation 450 state, and generates a pseudo-random pattern specified by the mask and initial state. The resulting pseudo-random sequence is then used as input to the constellation encoder 444 which maps the data into 2-bit constellations for each tone. The constellation encoder output is then multiplied by the values specified by a gain table, and input to the FFT engine. The FFT engine then performs an IFFT which produces a wide-band signal Operation of Cyclic Prefix Cyclic Prefix 402 remains Off as indicated in the packet header.

Change to C_MEDLEY State 816 (See FIG. 8)

Operation of Core Cpu

The example initialization sequence requires the state to be changed to C_MEDLEY 816 after 2000 frames of C_REVERB 814. The core Cpu 334 reads a location in the framer's memory, which indicates the frame number at which the last state change was performed by the framer, let this be 500 for example. Then the core Cpu adds 2000 to this to get the absolute frame number (2500) at which to transition to Medley and sends the following TxCtlMsg.

| TxCtlMsg from core Cpu to framer |
| --- |
| ChangeState at Frame Number = 2500<br>Channel Number = K<br>New State = Medley_State<br>Command Fields:<br>    Change_state_ASAP = 0<br>    Absolute_Frame_count = 1<br>    Reset_Frame_Counter = 0<br>    ...<br>Data:<br>    Pseudo_Rand_Gen_Mask<br>    Pseudo_Rand_Gen_Start_State |

Operation of Framer

The framer 440 puts the message in its message queue. When the channel's Current Frame Number reaches 2500, it will match the frame number in the TxCtlMsg, and the framer performs the state change. In the first frame of the new state, it creates the following TxPkt and sends it to the next module on the transmit data flow path.

| TxPkt sent on transmit path |
| --- |
| Packet Header<br>    Channel Number = K<br>    Extended Cmd Flag: Mapper<br>    Basic Tx Op: Cyclic_Prefix_On<br>    ...<br>Extended Commands:<br>    Current State = Pseudo_Rand_Gen_State<br>    Save_Pseudo_Rand_State = 1<br>    Start_at_saved_Pseudo_Rand_state = 0<br>    Pseudo_Rand_Gen_Mask<br>    Pseudo_Rand_Gen_Start_State<br>Data: |

The Medley state 816 requires the Pseudo-random generator state to be preserved from frame to frame, i.e., the state of the generator at the end of frame #n is to be used as the starting state for frame #n+1. Since, this is a multichannel system, a bit is set to command the mapper 422 to save the state of the generator. Then in the subsequent frames of the medley state, the mapper bits are set to start from the saved state (and also save the state at the end of the frame for the next frame), as shown below.

| TxPkt sent on transmit path |
| --- |
| Packet Header<br>    Channel Number = K<br>    Extended Cmd Flag: Mapper |

| TxPkt sent on transmit path |
| --- |
|     Basic Tx Op: Cyclic_Prefix_On<br>Extended Commands:<br>    Current State = Pseudo_Rand_Gen_State<br>    Save_Pseudo_Rand_State = 1<br>    Start_at_saved_Pseudo_Rand_state = 1<br>    Pseudo_Rand_Gen_Mask<br>    Pseudo_Rand_Gen_Start_State<br>Data: |

Operation of Mapper

The mapper sees that it is a pseudo-random generation state, and generates a pseudo-random pattern specified by the mask and initial state. For the first frame of medley, the given state will be used, and at the end of the frame, the state is saved as directed by the mapper extended command bits. The mapper can hold the pseudo-random state for each channel. For subsequent frames, the saved pseudo-random state is used as the starting state. The resulting pseudo-random sequence from the PRN generator 450 is used as input to the constellation encoder which maps the data into 2-bit constellations for each tone. The constellation encoder output is then multiplied by the values specified by a gain table, and input to the FFT engine. The FFT engine then performs an IFFT which produces a wide-band signal Operation of Cyclic Prefix The medley state is the first frame in our example initialization sequence, where the cyclic prefix is to be turned on. The cyclic prefix module 402 sees that the bit is set and then inserts the cyclic prefix as specified in the standard. The parameters related to the cyclic prefix, such has prefix size, etc. are written (before this frame) directly by the core Cpu 334 to the registers in the module.

Change to C_SHOWTIME State 818 (See FIG. 8)

Operation of Core Cpu

The example initialization sequence requires the state to be changed to C_MEDLEY after 1000 frames of C_MEDLEY. The core Cpu 334 sends the following TxCtlMsg to specify that the state change is to be done at frame number 3500 (since medley started at frame number 2500).

| TxCtlMsg from core Cpu to framer |
| --- |
| ChangeState at Frame Number = 3500<br>Channel Number = K<br>New State = Medley_State<br>Command Fields:<br>    Change_state_ASAP = 0<br>    Absolute_Frame_count = 1<br>    Reset_Frame_Counter = 0<br>    ...<br>Data:<br>    Framer_Parameter_Table_Num = F<br>    Mapper_Parameter_Table_Num = M |

Operation of Framer

The framer 440 puts the message in its message queue 900. when the channel's Current Frame Number reaches 3500, it will match the frame number in the TxCtlMsg, and the framer performs the state change. In the first frame of the new state, the framer starts to perform the actual framing of the ADSL data. The core Cpu should have written the channel's frame-related parameters, to the fields of that channel's Status structures, e.g. status record/structure 912 for channel #0 in the Framer's memory 906.

The framer reads the data received from the ATM interface 334,340, which has been held in the input Fifo 452 performs the Framer operations (CRC, Scrambler, RS encoder, Interleaver) and then writes to the Mapper 422.

| TxPkt sent on transmit path |
| --- |
| Packet Header<br>  Channel Number = K<br>  Extended Cmd Flag: Mapper<br>  Basic Tx Op: Cyclic_Prefix_On<br>  . . .<br>Extended Commands:<br>  Current State = Showtime_State<br>  Mapper_Parameter_Table_Num = M<br>  . . .<br>Data:<br>  Framed User Data (framer output) |

Operation of Mapper

The Mapper 422 sees that it is a Showtime state, and extracts the bits from data part according to the bits/tone in the specified mapper parameter table. The core Cpu should have written the mapper memory with the mapper parameter table. The memory can hold multiple such frame parameter tables—there will one such table per channel, plus a few extra ones. The core Cpu chooses a table which is not under use, and writes the channel's mapper parameters (determined during initialization) to the chosen mapper parameter table.

Operation of Cyclic Prefix

Cyclic Prefix remains On as indicated in the packet header.

Receive Path Operation for Example Initialization Sequence (See FIG. 8)

The receive path demodulation modules are controlled similar to the transmit path with the core Cpu 334 sending messages to the Receive Microcontroller 318 (RxCpu) and/or the processor 954 within the control packet assembler 404. These microcontroller(s) in turn creates the appropriate packets to control the asic modules in the receive path data flow and remove any cyclic prefix if present. The messages e.g. message 960 for channel #0 are sent to the RxCpu from the core Cpu 334 are called RxCtlMsg (Receive Control Message).

The core cpu 334, the receive controller 318 and the prefix remover 404 operate as a receive path packet assembler for packetizing digitized symbols from a plurality of communication channels from the AFE 212/214 (See FIG. 2) into corresponding receive packets. Collectively these same modules inject receive control parameters in the header and/or control portions of the selected ones of the packets to control the demodulation of each packet by the demodulation modules, e.g. de-framer de-encoder 332 and FTE 322 and submodules thereof on the receive path.

The control packet assembler 404 and prefix remover and/or receive controller 318 keeps an active channel list 958 of channels in its memory 956 indicating the order in which the channels are to be operated on and the bandwidth allocated to each channel (in each frame period). It also keeps a queue 950 of setup parameters, e.g.RxCtlMsg entries on a channel basis, as shown in FIG. 9B. This list contains the appropriate setup sequence and timing sequence and timing for each of the modules in the receive path and for all the X-DSL protocols supported by the DSP 218. The Rx controller and/or control packet assembler also maintains the current status of each channel in a Channel-status list 962, which holds among other items, the Current Frame number, the current state, and the current packet header to be sent. For a N channel modem, there will be N queues of setup parameters RxCtlMsg and N Channel-status records within the channel-status list. In the embodiment of the invention shown a master-slave embodiment of the control of active channels and the setup of sessions is implemented with the core Cpu in master status to the Receive controller 318 and the Framer 440. The core Cpu 334 memory contains a protocol list of setup procedures for each of the supported X-DSL protocols. The core Cpu determines which channels are active by setup messages which it sends to the receive controller and prefix remover and which form the setup parameter queue 950. The controller or prefix remover constructs and initiates the setup parameter queue and the channel-status list and active channel lists accordingly. In an alternate embodiments of the invention other management models, e.g. peer-to-peer and distributed could be implemented for managing the packet based communications using the same control structures without departing from the scope of the invention. In these alternate embodiments of the invention the control structures, e.g. active channel list 958, setup parameters 950 and channel status list 952 may be found exclusively at the level of the core processor 334 or distributed down the line of command to the Rx controller 318 and/or the control packet assembler Cpu 954.

The received samples from the AFE (after any required decimation and filtering) are buffered in a Fifo 400 as shown in FIG. 4. The received samples can be sent from the A-fifo directly to the core Cpu 334, or it can be sent through the ASIC modules, with the modules being set to desired configuration. The data can be then sent to the core Cpu from intermediate points in the data flow, or it can be sent out through the ATM interface. A small header can be optionally placed at the start of the data, which can indicate the channel number, frame number, and type of data (time-domain, frequency-domain FFT output, etc.). This header makes it easy for the firmware running on the core Cpu, to keep track of the data received.

The RxCpu maintains queues 950 of RxCtlMsgs (one queue per channel) and status structures 952, one for each channel. The RxCpu receives a signal at each frame (or symbol) boundary. On receiving this signal, the RxCpu, then performs each channel one after another, in the sequence indicated by a channel order list 958. For each channel, it checks if there are any RxCtlMsg for that channel. If the RxCtlMsg indicates that it is to be done 'ASAP', or if the frame number in the message matches the Current Frame Number in the channel's status struct, e.g. status structure 962 for channel #0, then the state is changed (a new packet with different settings is created and sent). Otherwise the current state is maintained (existing packet with no changes or minor changes is sent).

The example initialization sequence shows that after R_Quiet 820 (See FIG. 8) that the R_ACK tone 822 must be detected, in order to know when to transition to C_REVERB 824. In addition to tone detection, the receive path of the modem requires tasks such as training of FEQ (frequency domain equalizers) etc. The processing on the receive path is done based on the state in which the receive path is in. The CoreCpu 334 sends RxCtlMsg to the receive processor 954 to setup the transition to the desired receive state to occur at the desired frame (symbol) boundary. The operation of the receive path in some of the states are described below. The receive path complements the features of the transmit path.

Initial Operation Before Channel Is Started

Initially the channel is set as Disabled state (on power-up) in the RxCpu's state structure of that channel 962. The RxCpu when it sees that the channel is in disabled state, does not send any packet for that channel. Thus the later modules (FFT, FEQ, etc.) do not produce any data for this channel, which means that no data is sent out on the channel.

The following text describes the operation of the receive path components: core cpu 334, RxCpu 954, DFT 322, FEQ 426, decoder 428, tone reorderer 430 and deframer 434 through the redacted startup/initialization phase of operation shown in FIG. 8.

Note that the receive path operation is determined by the transmit sequence of the remote side. The states of the receive operation is categorized according to the type of processing, as described below.

Tone Detect State (R_QUIET, R_ACK of FIG. 8)

This state is used when waiting for the other side to send a tone (which is usually one of the earlier stages of initialization). For example, the RxCtlMsg from the CoreCpu 334 to the RxCpu 954 setting the receive path to start operation in this tone-detect state is shown below.

The RxCpu creates the packet header and extended commands and appends the data read from the FIFO 400. The received samples will be sent through the FFT 322, and the FFT output can be sent to a tone detector hardware located in a submodule of the FEQ 426. The tone detector can be configured to look for a desired set of tones—this is a fully hardware solution. Alternately, the architecture also allows the FFT output to be sent to the CoreCpu by bypassing the receive path modules. The CoreCpu can then (under software control) determine the presence of a tone—this is a fully software solution.

The architecture also supports a hardware-assisted software approach, which provides high performance while maintaining the flexibility of a software approach. The extended commands and packet header are set so that the FEQ module 426 performs averaging of the power for each tone in a specified set of tones. The FEQ module in the Demapper has a Power-Averaging hardware, which can accumulate the square of the real and imaginary parts of the FFT output value of a tone. The FEQ module also has memory area to hold the intermediate accumulated values of each tone for the various channels. The desired set of tones for which the power is to be averaged is specified by writing a table in the FEQs memory 426. This average power of each of the specified tones can then be read into the CoreCpu's memory 328 via direct memory access (DMA). The task of computing the power in each symbol period, which requires a lot of mips on the CoreCpu, is moved to the hardware. The algorithm to declare the presence of a tone (based on the average received power of each tone) is still in software, providing flexibility.

The following RxCtlMsg is sent to initiate the tone detection state.

| RxCtlMsg from core cpu to RxCpu |
|---|
| ChangeState at Frame Number = −1<br>Channel Number = K<br>New State = Tone_Detect_State |

| RxCtlMsg from core cpu to RxCpu |
|---|
| Command Fields:<br>    Change_state_ASAP = 1<br>    Reset_Frame_Counter = 1<br>    Tone_Detect_Avg_period = 8<br>    . . .<br>Data:<br>    . . . |

Operation of Receive Path Modules

The RxCpu sees the change state ASAP bit and performs the state change, and resets its frame counter to 0. The RxCpu creates the packet header and extended commands and appends the data read from the FLFO 400. It then sends the RxPkt shown below, for the first frame to the next module on the receive data flow path. After sending the packet for the channel for that frame, the channel's Current Frame Counter field is incremented.

| RxPkt sent on receive path |
|---|
| Packet Header<br>    Channel Number = K<br>    Extended Cmd Flag: TEQ, FEQ<br>    Basic Rx Op: none<br>    . . .<br>Extended Commands:<br>    Current State = Tone_Detect_State<br>    Tone_Detect_Reset_Avg = 1<br>    Tone_Detect_Accumulate = 1<br>    Tone_Detect_Signal_Done = 0<br>    . . .<br>Data:<br>    Received samples |

The Tone_Detect_Reset_Avg command resets the accumulator values in the FEQs Power-Averaging module, and then the Tone_Detect_Accumulate command enables the accumulation of the average power in this symbol period. The FEQ has a context register per channel where a bit is set to indicate that the Tone_Detect_Accumulate is enabled for this channel. In subsequent frames of the averaging period except the last frame (frames 1 to 6, in this example), the RxCpu need not send extended command as the FEQ uses the context bit to enable the addition of the power in this frame to the values from the previous frames. In the last frame of the averaging period, frame 7 in this example, the Tone_Detect_Signal_Done bit is set to 1. This causes the FEQ to signal the DMA controller after the accumulation is done, which results in the 8-frame accumulated value being sent to the CoreCpu via DMA.

The receive path remains in the tone detect through the R_QUIET, and then R_ACK. The tone detection triggers the transmit path's state change from C_QUIET to C_REVERB as described earlier. The tone detection can be maintained until a wideband power is detected (power on a large number of tones), which indicates that R_REVERB has started. Then the state is transitioned to the TEQ training state as described below. %

Time Domain Equalizer (TEQ) Training State Operation

The core Cpu initiates the TEQ training at the appropriate point in the initialization sequence, by sending messages to the RxCpu. There are multiple algorithms for estimating the coefficients of the TEQ filter performed within the DFT mapper 424. If a time-domain based algorithm is to be used, then the received time domain samples can be sent from the A-fifo 452 directly to the core Cpu (or it can be sent through the ASIC modules, with all the modules in bypass, and then sent to the core Cpu). If a frequency-domain input is required, then the FFT output can be sent to the core Cpu.

The TEQ training algorithm determines the symbol boundary and calculates the values of the TEQ coefficients. The TEQ coefficient values are written directly to the registers in the TEQ module. The core Cpu sends a message to the RxCpu, telling it to skip a specified number of samples at the start of the next frame. By skipping these samples, the symbol boundary of our receiver can be aligned to that of the remote side transmitter.

Freq Domain Equalizer (FEQ) Training State Operation

The core Cpu initiates the FEQ training at the appropriate point in the initialization sequence, by sending messages to the RxCpu 954. The RxCpu sets bits in the packet header and extended commands, to control the FEQ module 426. The FEQ module has a configurable pseudo-random generator 454 (similar to the one in the mapper on the transmit path). The FEQ is controlled to enable the pseudo-random generator to generate the same known sequence which the other side is transmitting. The generated pseudo-random sequence is used as a reference signal for adapting its coefficients.

The FEQ module can be set to either update the FEQ coefficients or not in any symbol period. The update (adaptation) of FEQ coefficients could be based on a known pseudo-random generated signal, or based on the Slicer portion of the FEQ 426.

Showtime (Receiving Data) State Operation

Before entering the showtime state, the CoreCpu will have written the FEQ memory with the parameters such as tone table (which indicates the number of bits to be extracted from each tone) to a parameter table. The memory can hold multiple such FEQ parameter tables—there will one such table per channel, plus a few extra ones. The core cpu chooses a table which is not under use, and writes the channel's FEQ parameters (determined during initialization) to the chosen FEQ parameter table. The FEQ coefficients will have been trained by now. The DeFramer will have been configured with the details of the frame to be received, in a similar manner by writing a deframer parameter table in the deframer's memory. The CoreCpu 334 sends the following RxCtlMsg to specify that the state change is to be done at particular frame number, say 4000.

| RxCtlMsg from core cpu RxCpu |
|---|
| ChangeState at Frame Number = 4000 |
| Channel Number = K |
| New State = Showtime_State |
| Command Fields: |
| Change_state_ASAP = 0 |
| Absolute_Frame_count = 1 |
| Reset_Frame_Counter = 0 |
| . . . |
| Data: |
| FEQ_Parameter_Table_Num = M |

The RxCpu will perform the state transition to Showtime state 828, by changing the packet header and extended commands to enable all the modules in the receive chain to perform the showtime mode of operation.

| RXPkt sent on receive path |
|---|
| Packet Header |
|   Channel Number = K |
|   Extended Cmd Flag: FEQ,Deframer |
|   Basic Rx Op: |
|   . . . |
| Extended Commands: |
|   Current State = Showtime_State |
|   FEQ_Parameter_Table_Num = M |
|   Deframer_Parameter_Table_Num = F |
|   . . . |
| Data: |
|   Received samples |

The tone reorderer 430 packs the constellation decoded bits according to the bit table which was specified in FEQ parameter table. The deframer does the deframing according to the parameters specified.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A digital signal processor comprising:

a transmit path packet assembler for packetizing digitized data from a plurality of communication channels into corresponding transmit packets, and for injecting transmit control parameters into a transmit path via selected ones of the transmit packets to control the modulation of a corresponding communication channel;

a receive path packet assembler for packetizing digitized data from the plurality of communication channels into corresponding receive packets, and for injecting receive control parameters into a receive path via selected ones of the receive packets to control the demodulation of the corresponding communication channel; and a plurality of modulation and demodulation modules configured to form at least a portion of the transmit path and at least a portion of a receive path for the modulation and demodulation of the transmit and receive packets respectively, and with selected ones of the modules responsive to the control parameters injected by at least one of the transmit path packet assembler and the receive path packet assembler to vary a processing of the corresponding communication channel.

2. The digital signal processor of claim 1, wherein the transmit path packet assembler further comprises:

a processor coupled to the transmit path for initializing channel setup for each of the plurality of communication channels on the transmit path and the processor outputting messages with the transmit control parameters defining both state changes for channel initialization within selected ones of the modulation modules on the transmit path together with corresponding frame or symbol boundaries for implementation thereof; and a framer responsive to the messages from the processor to detect the corresponding frame or symbol boundaries and to initiate an associated state change by injecting the transmit control parameters into the selected ones of the transmit packets for each of the plurality of communication channels to vary the processing thereof.

3. The digital signal processor of claim 1, wherein the receive path packet assembler further comprises:
- a processor coupled to the receive path for initializing channel setup for each of the plurality of communication channels on the receive path and the processor outputting messages with the receive control parameters defining both state changes for channel initialization within selected ones of the modulation modules on the receive path together with corresponding frame or symbol boundaries for implementation thereof; and
- a controller responsive to the messages from the processor to detect the corresponding frame or symbol boundaries and to initiate an associated state change by injecting the receive control parameters into the selected ones of the receive packets for each of the plurality of communication channels to vary the processing thereof.

4. The digital signal processor of claim 1, further comprising:
- a processor common to both the transmit and receive path packet assemblers and the processor coupled to the receive path and the transmit path for initializing channel setup and the processor outputting messages with the control parameters defining both state changes for channel initialization within selected ones of the modulation modules together with corresponding frame or symbol boundaries for implementation thereof on both the transmit and receive paths; and
- the receive path and transmit path packet assemblers responsive to the messages to detect the corresponding frame or symbol boundaries on the corresponding one of the receive path and the transmit path and to initiate an associated state change by injecting the corresponding control parameters into the selected ones of the receive and transmit packets for each of the plurality of communication channels to vary the processing thereof.

5. The digital signal processor of claim 4, wherein the core processor further comprises responsiveness to events on the receive path to output messages to the transmit path packet assembler to initiate corresponding state changes on the transmit path.

6. The digital signal processor of claim 1, wherein the plurality of communication channels exhibit a plurality of X-DSL protocols.

7. The digital signal processor of claim 1, wherein;
- the transmit and receive control parameters include timing instructions with a corresponding frame numbers for state changes in the processing of a corresponding communication channel on the transmit and receive paths respectively; and
- wherein further selected ones of the plurality of modulation and demodulation modules on the transmit and receive paths respectively include frame counters to implement the timing of the corresponding state change at the corresponding frame number.

8. A modem comprising:
- a transmit path packet assembler for packetizing digitized data from a plurality of communication channels into corresponding transmit packets, and for injecting transmit control parameters into a transmit path via selected ones of the transmit packets to control the modulation of a corresponding communication channel;
- a receive path packet assembler for packetizing digitized data from the plurality of communication channels into corresponding receive packets, and for injecting receive control parameters into a receive path via selected ones of the receive packets to control the demodulation of the corresponding communication channel; and
- a plurality of modulation and demodulation modules configured to form at least a portion of the transmit path and at least a portion of a receive path for the modulation and demodulation of the transmit and receive packets respectively, and with selected ones of the modules responsive to the control parameters injected by at least one of the transmit path packet assembler and the receive path packet assembler to vary a processing of the corresponding communication channel.

9. The modem of claim 8, wherein the transmit path packet assembler further comprises:
- a processor coupled to the transmit path for initializing channel setup for each of the plurality of communication channels on the transmit path and the processor outputting messages with the transmit control parameters defining both state changes for channel initialization within selected ones of the modulation modules on the transmit path together with corresponding frame or symbol boundaries for implementation thereof; and
- a framer responsive to the messages from the processor to detect the corresponding frame or symbol boundaries and to initiate an associated state change by injecting the transmit control parameters into the selected ones of the transmit packets for each of the plurality of communication channels to vary the processing thereof.

10. The modem of claim 8, wherein the receive path packet assembler further comprises:
- a processor coupled to the receive path for initializing channel setup for each of the plurality of communication channels on the receive path and the processor outputting messages with the receive control parameters defining both state changes for channel initialization within selected ones of the modulation modules on the receive path together with corresponding frame or symbol boundaries for implementation thereof; and
- a controller responsive to the messages from the processor to detect the corresponding frame or symbol boundaries and to initiate an associated state change by injecting the receive control parameters into the selected ones of the receive packets for each of the plurality of communication channels to vary the processing thereof.

11. The modem of claim 8, further comprising:
- a processor common to both the transmit and receive path packet assemblers and the processor coupled to the receive path and the transmit path for initializing channel setup and the processor outputting messages with the control parameters defining both state changes for channel initialization within selected ones of the modulation modules together with corresponding frame or symbol boundaries for implementation thereof on both the transmit and receive paths; and
- the receive path and transmit path packet assemblers responsive to the messages to detect the corresponding frame or symbol boundaries on the corresponding one of the receive path and the transmit path and to initiate an associated state change by injecting the corresponding control parameters into the selected ones of the receive and transmit packets for each of the plurality of communication channels to vary the processing thereof.

12. The modem of claim 11, wherein the core processor further comprises responsiveness to events on the receive path to output messages to the transmit path packet assembler to initiate corresponding state changes on the transmit path.

13. The modem of claim 8, wherein the plurality of communication channels exhibit a plurality of X-DSL protocols.

14. The modem of claim 8, wherein;

the transmit and receive control parameters include timing instructions with a corresponding frame numbers for state changes in the processing of a corresponding communication channel on the transmit and receive paths respectively; and wherein further selected ones of the plurality of modulation and demodulation modules on the transmit and receive paths respectively include frame counters to implement the timing of the corresponding state change at the corresponding frame number.

15. A method for operating a packet based modem with a transmit path and a receive path each including a plurality of modulation and demodulation modules respectively, and the method comprising:

packetizing digitized data from a plurality of communication channels into corresponding transmit packets and receive packets for the transmit and receive paths respectively;

injecting transmit control parameters and receive control parameters into the transmit and receive paths via selected ones of the transmit and receive packets to control the processing respectively of a corresponding communication channel; and responding within selected ones of the modulation and demodulation modules to the control parameters injected in the injecting act to vary a processing of the corresponding communication channel.

16. The method of claim 15, wherein the injecting act further comprises:

delivering to a selected one of the modulation modules transmit control parameters for initialization of a corresponding communication channel and the control parameters including both state changes for selected ones of the modulation modules on the transmit path together with corresponding frame or symbol boundaries for implementation thereof;

detecting within the selected one of the modulation modules the corresponding frame or symbol boundaries delivered in the delivering act; and propagating the control parameters to others of the modulation modules on the transmit path via information injected into selected ones of the transmit packets associated with the corresponding communication channel.

17. The method of claim 15, wherein the injecting act further comprises:

delivering to a selected one of the demodulation modules receive control parameters for initialization of a corresponding communication channel and the control parameters including both state changes for selected ones of the demodulation modules on the receive path together with corresponding frame or symbol boundaries for implementation thereof;

detecting within the selected one of the demodulation modules the corresponding frame or symbol boundaries delivered in the delivering act; and propagating the control parameters to others of the demodulation modules on the receive path via information injected into selected ones of the receive packets associated with the corresponding communication channel.

18. The method of claim 15, injecting act further comprises:

detecting an event associated with a given communication channel on the receive path; and injecting corresponding transmit control parameters into the transmit path to vary the processing of the given communication channel responsive to the event detected in the detecting act.

19. The method of claim 15, wherein the plurality of communication channels exhibit a plurality of X-DSL protocols.

20. A means for operating a packet based modem with a transmit path and a receive path each including a plurality of modulation and demodulation modules respectively, and the means comprising:

means for packetizing digitized data from a plurality of communication channels into corresponding transmit packets and receive packets for the transmit and receive paths respectively;

means for injecting transmit control parameters and receive control parameters into the transmit and receive paths via selected ones of the transmit and receive packets to control the processing respectively of a corresponding communication channel; and means for responding within selected ones of the modulation and demodulation modules to the control parameters injected in the injecting act to vary a processing of the corresponding communication channel.

* * * * *